US012179608B2

(12) United States Patent
Cronin

(10) Patent No.: US 12,179,608 B2
(45) Date of Patent: Dec. 31, 2024

(54) MONITORING AND MANAGING TEMPERATURE OF POWER PACKS

(71) Applicant: SUSTAINABLE ENERGY TECHNOLOGIES, INC., Wilmington, DE (US)

(72) Inventor: John Cronin, Wilmington, DE (US)

(73) Assignee: SUSTAINABLE ENERGY TECHNOLOGIES, INC., Wilmington, DE (US)

( * ) Notice: Subject to any disclaimer, the term of this patent is extended or adjusted under 35 U.S.C. 154(b) by 105 days.

(21) Appl. No.: 18/075,358

(22) Filed: Dec. 5, 2022

(65) Prior Publication Data

US 2023/0173923 A1 Jun. 8, 2023

Related U.S. Application Data

(60) Provisional application No. 63/285,885, filed on Dec. 3, 2021.

(51) Int. Cl.
*B60L 3/00* (2019.01)
*B60L 50/40* (2019.01)
*B60W 10/26* (2006.01)
*H01G 11/18* (2013.01)

(52) U.S. Cl.
CPC .......... *B60L 3/0046* (2013.01); *B60L 50/40* (2019.02); *B60W 10/26* (2013.01); *H01G 11/18* (2013.01)

(58) Field of Classification Search
CPC .... B60L 3/0046; B60L 50/40; B60L 2260/50; B60L 2240/545; B60L 58/27; B60L 58/26; B60W 10/26; H01G 11/18; H01G 11/08; H01G 11/10; H02J 7/007192; H02J 7/0048; H02J 2207/50; H02J 2310/48
See application file for complete search history.

(56) References Cited

U.S. PATENT DOCUMENTS

| 6,011,379 | A | 1/2000 | Singh et al. |
|---|---|---|---|
| 6,724,102 | B1 | 4/2004 | Kelwaski et al. |
| 7,548,894 | B2 | 6/2009 | Fuji |
| 8,881,832 | B2 | 11/2014 | McMillon et al. |
| 8,950,662 | B2 | 2/2015 | Soborski |
| 9,053,870 | B2 | 6/2015 | Yu et al. |

(Continued)

FOREIGN PATENT DOCUMENTS

| CN | 104057901 | 9/2014 |
|---|---|---|
| CN | 106252096 | 12/2016 |

(Continued)

OTHER PUBLICATIONS

U.S. Appl. No. 17/976,674, John Cronin, A Modular Power Pack Energy Storage Unit, filed Oct. 28, 2022.

(Continued)

*Primary Examiner* — Yuen Wong
(74) *Attorney, Agent, or Firm* — Polsinelli LLP

(57) ABSTRACT

Systems and methods for monitoring and managing temperature of power packs of supercapacitors are disclosed. The system comprises a plurality of supercapacitor power packs associated with an electric motor. Further, an energy database is provided and configured to store data related to the charge of the supercapacitor power packs and thermal energy requirements related to the supercapacitor power packs.

17 Claims, 11 Drawing Sheets

(56) References Cited

U.S. PATENT DOCUMENTS

| | | |
|---|---|---|
| 9,056,556 B1 | 6/2015 | Hyde et al. |
| 9,070,505 B2 | 6/2015 | Saitoh |
| 9,079,505 B1 | 7/2015 | Hyde et al. |
| 9,145,760 B2 | 9/2015 | McMillon et al. |
| 9,169,719 B2 | 10/2015 | McMillon et al. |
| 9,233,860 B2 | 1/2016 | Liu et al. |
| 9,318,271 B2 | 4/2016 | Fletcher et al. |
| 9,379,546 B2 | 6/2016 | Li |
| 9,519,942 B2 | 12/2016 | Soborski |
| 9,940,572 B2 | 4/2018 | Soborski |
| 10,061,958 B2 | 8/2018 | Voigt et al. |
| 10,173,663 B1 | 1/2019 | Combs |
| 10,235,597 B2 | 3/2019 | Voigt et al. |
| 10,380,601 B2 | 8/2019 | Soborski |
| 10,826,304 B1 | 11/2020 | Thomas et al. |
| 2004/0036475 A1 | 2/2004 | Pascoe et al. |
| 2005/0057098 A1 | 3/2005 | Bouchon |
| 2006/0132102 A1 | 6/2006 | Harvey |
| 2006/0178170 A1 | 8/2006 | Chung et al. |
| 2006/0284617 A1 | 12/2006 | Kozlowski et al. |
| 2006/0285617 A1 | 12/2006 | Roberts et al. |
| 2007/0080662 A1 | 4/2007 | Wu |
| 2007/0258188 A1 | 11/2007 | Shiue et al. |
| 2008/0276825 A1 | 11/2008 | King et al. |
| 2009/0021871 A1 | 1/2009 | Moran et al. |
| 2010/0060231 A1 | 3/2010 | Trainor et al. |
| 2010/0116574 A1 | 5/2010 | Gilmore |
| 2010/0123436 A1 | 5/2010 | Herrod et al. |
| 2010/0225282 A1 | 9/2010 | Paasch |
| 2010/0305792 A1 | 12/2010 | Wilk et al. |
| 2011/0003188 A1 | 1/2011 | Cheng et al. |
| 2011/0080133 A1 | 4/2011 | Tamburrino et al. |
| 2012/0029724 A1 | 2/2012 | Formanski et al. |
| 2012/0041626 A1 | 2/2012 | Kelty et al. |
| 2012/0049621 A1 | 3/2012 | Shinoda |
| 2012/0062186 A1 | 3/2012 | Dessirier et al. |
| 2012/0136535 A1 | 5/2012 | Buford et al. |
| 2012/0183815 A1 | 7/2012 | Johnston et al. |
| 2012/0187906 A1 | 7/2012 | Martienssen et al. |
| 2012/0293077 A1 | 11/2012 | Tousain et al. |
| 2013/0030630 A1 | 1/2013 | Luke et al. |
| 2013/0033203 A1 | 2/2013 | Luke et al. |
| 2013/0162037 A1 | 6/2013 | Kim et al. |
| 2013/0179061 A1* | 7/2013 | Gadh .......... B60L 53/305 701/1 |
| 2013/0181680 A1 | 7/2013 | Chau |
| 2013/0188283 A1 | 7/2013 | Midholm et al. |
| 2014/0129040 A1 | 5/2014 | Emadi et al. |
| 2015/0046012 A1 | 2/2015 | Chen et al. |
| 2015/0047844 A1 | 2/2015 | McMillon et al. |
| 2015/0077054 A1 | 3/2015 | Uyeki |
| 2015/0274030 A1 | 10/2015 | Payne et al. |
| 2015/0275788 A1 | 10/2015 | Dufford et al. |
| 2016/0079633 A1 | 3/2016 | Wahlstrom et al. |
| 2016/0167677 A1 | 6/2016 | Schaefer et al. |
| 2016/0176298 A1 | 6/2016 | Watson et al. |
| 2016/0283842 A1 | 9/2016 | Pescianschi |
| 2016/0288666 A1 | 10/2016 | Kim et al. |
| 2016/0297316 A1 | 10/2016 | Penilla et al. |
| 2016/0301246 A1 | 10/2016 | Sato |
| 2016/0349330 A1 | 12/2016 | Barfield, Jr. et al. |
| 2016/0365833 A1 | 12/2016 | Saby et al. |
| 2016/0375780 A1 | 12/2016 | Penilla et al. |
| 2016/0375786 A1 | 12/2016 | Liu |
| 2016/0380455 A1 | 12/2016 | Greening et al. |
| 2017/0001585 A1 | 1/2017 | Fink |
| 2017/0109467 A1 | 4/2017 | Shimizu |
| 2017/0234251 A1 | 8/2017 | Commenda et al. |
| 2018/0074132 A1 | 3/2018 | Day et al. |
| 2018/0134171 A1 | 5/2018 | Hyde et al. |
| 2018/0137991 A1 | 5/2018 | Roumi et al. |
| 2018/0236887 A1 | 8/2018 | Sarkar et al. |
| 2018/0283887 A1 | 10/2018 | Dudar et al. |
| 2019/0031125 A1 | 1/2019 | Rozman et al. |
| 2019/0061541 A1 | 2/2019 | Penilla et al. |
| 2019/0097362 A1 | 3/2019 | Haba et al. |
| 2019/0107406 A1 | 4/2019 | Cox et al. |
| 2019/0180949 A1 | 6/2019 | Liu et al. |
| 2019/0196851 A1 | 6/2019 | Penilla et al. |
| 2020/0070679 A1 | 3/2020 | Wang et al. |
| 2020/0079223 A1 | 3/2020 | Puri et al. |
| 2020/0094810 A1 | 3/2020 | Moreland |
| 2020/0247239 A1 | 8/2020 | Stoltz |
| 2020/0328622 A1 | 10/2020 | Abu Qahouq |
| 2020/0365336 A1 | 11/2020 | Luo et al. |
| 2021/0005939 A1 | 1/2021 | Tajima et al. |
| 2021/0083345 A1 | 3/2021 | Ciaccio et al. |
| 2021/0088591 A1 | 3/2021 | Naha et al. |
| 2021/0123975 A1 | 4/2021 | Sarwat et al. |
| 2021/0138927 A1 | 5/2021 | Maeng et al. |
| 2021/0190868 A1 | 6/2021 | Benoit et al. |
| 2021/0202989 A1 | 7/2021 | Lee et al. |
| 2021/0237578 A1 | 8/2021 | Ing |
| 2021/0284043 A1 | 9/2021 | Wang et al. |
| 2023/0136195 A1 | 5/2023 | Cronin |
| 2023/0170732 A1 | 6/2023 | Cronin |
| 2023/0173923 A1 | 6/2023 | Cronin |
| 2023/0173936 A1 | 6/2023 | Cronin |
| 2023/0173949 A1 | 6/2023 | Cronin |
| 2023/0174041 A1 | 6/2023 | Cronin |
| 2023/0174635 A1 | 6/2023 | Cronin |
| 2023/0182580 A1 | 6/2023 | Cronin |
| 2023/0182616 A1 | 6/2023 | Cronin |
| 2023/0182617 A1 | 6/2023 | Cronin |
| 2023/0182621 A1 | 6/2023 | Cronin |
| 2023/0187960 A1 | 6/2023 | Cronin |
| 2023/0192063 A1 | 6/2023 | Cronin |
| 2023/0211667 A1 | 7/2023 | Cronin |
| 2023/0216317 A1 | 7/2023 | Cronin |
| 2023/0223784 A1 | 7/2023 | Cronin |
| 2023/0326268 A1 | 10/2023 | Cronin |
| 2024/0181927 A1 | 6/2024 | Cronin |

FOREIGN PATENT DOCUMENTS

| | | |
|---|---|---|
| CN | 106252099 | 12/2016 |
| CN | 109888904 | 10/2020 |
| EP | 2 278 677 | 1/2011 |
| WO | WO 2014/107151 | 7/2014 |
| WO | 2014/165197 A1 | 10/2014 |
| WO | WO 2015/016965 | 2/2015 |
| WO | WO 2018/041095 | 3/2018 |
| WO | WO 2018/106799 | 6/2018 |
| WO | 2018/231932 A1 | 12/2018 |
| WO | 2019/224527 A1 | 11/2019 |
| WO | 2020/240148 A2 | 12/2020 |
| WO | WO 2021/122753 | 6/2021 |
| WO | 2023/076632 A1 | 5/2023 |
| WO | WO 2023/102265 | 6/2023 |
| WO | WO 2023/102266 | 6/2023 |
| WO | WO 2023/102267 | 6/2023 |
| WO | WO 2023/102269 | 6/2023 |
| WO | WO 2023/102274 | 6/2023 |
| WO | WO 2023/107502 | 6/2023 |
| WO | WO 2023/107503 | 6/2023 |
| WO | WO 2023/107504 | 6/2023 |
| WO | WO 2023/107505 | 6/2023 |
| WO | WO 2023/107513 | 6/2023 |
| WO | WO 2023/107514 | 6/2023 |
| WO | WO 2023/107752 | 6/2023 |
| WO | WO 2023/114326 | 6/2023 |
| WO | WO 2023/129639 | 7/2023 |
| WO | WO 2023/129707 | 7/2023 |
| WO | WO 2023/129739 | 7/2023 |
| WO | WO 2023/215003 | 11/2023 |

OTHER PUBLICATIONS

PCT/US22/048287, A Modular Power Pack Energy Storage Unit, Oct. 28, 2022.

U.S. Appl. No. 18/075,333, John Cronin, Modular Multi-Type Power Pack Charging Apparatus, filed Dec. 5, 2022.

(56) References Cited

OTHER PUBLICATIONS

PCT/US22/51865, Modular Multi-Type Power Pack Charging Apparatus, Dec. 5, 2022.
U.S. Appl. No. 18/075,299, John Cronin, System and Method for Energy Management of a Power Pack for an Electric Vehicle Including Photovoltaic Charging, filed Dec. 5, 2022.
PCT/US22/51863, System and Method for Energy Management of a Power Pack for an Electric Vehicle Including Photovoltaic Charging, Dec. 5, 2022.
U.S. Appl. No. 18/075,338, John Cronin, Integrated Power System and Method for Energy Management For Electric Vehicle, filed Dec. 5, 2022.
PCT/US22/51867, Integrated Power System and Method for Energy Management For Electric Vehicle, Dec. 5, 2022.
PCT/US22/51870, Monitoring and Managing Temperature of Power Packs, Dec. 5, 2022.
U.S. Appl. No. 18/075,402, John Cronin, Modular Power Pack Energy Storage Unit, filed Dec. 5, 2022.
PCT/US22/51881, Modular Power Pack Energy Storage Unit, Dec. 5, 2022.
U.S. Appl. No. 18/076,248, John Cronin, Charge Compatible Supercapacitor System, filed Dec. 6, 2022.
PCT/US22/52033, Charge Compatible Supercapacitor System, Dec. 6, 2022.
U.S. Appl. No. 18/076,255, John Cronin, Evaluating and Managing Supercapacitors of Electric Vehicles, filed Dec. 6, 2022.
PCT/US22/52034, Evaluating and Managing Supercapacitors of Electric Vehicles, Dec. 6, 2022.
U.S. Appl. No. 18/076,283, John Cronin, Electric Vehicle Supercapacitor Thermal Management, filed Dec. 6, 2022.
PCT/US22/52045, Electric Vehicle Supercapacitor Thermal Management, Dec. 6, 2022.
U.S. Appl. No. 18/076,358, John Cronin, Charging Electric Vehicle Supercapacitors Using Solar Energy, filed Dec. 6, 2022.
PCT/US22/52054, Charging Electric Vehicle Supercapacitors Using Solar Energy, Dec. 6, 2022.
U.S. Appl. No. 18/076,259, John Cronin, System and Method for Determining Range and Capacity of Supercapacitor Battery Storage for Electric Vehicle, filed Dec. 6, 2022.
PCT/US22/52035, System and Method for Determining Range and Capacity of Supercapacitor Battery Storage for Electric Vehicle, Dec. 6, 2022.
U.S. Appl. No. 18/076,266, John Cronin, System and Method for User-Defined Electric Vehicle Supercapacitor Batteries, filed Dec. 6, 2022.
PCT/US22/52036, System and Method for User-Defined Electric Vehicle Supercapacitor Batteries, Dec. 6, 2022.
U.S. Appl. No. 18/076,321, John Cronin, System and Method for Analyzing Temperature Changes in Supercapacitor Battery Storage for Electric Vehicle, filed Dec. 6, 2022.
PCT/US22/52049, System and Method for Analyzing Temperature Changes in Supercapacitor Battery Storage for Electric Vehicle, Dec. 6, 2022.
U.S. Appl. No. 18/079,841, John Cronin, Method and Systems to Trickle Charge Electric Vehicle's Supercapacitors Using Solar Energy, filed Dec. 12, 2022.
PCT/US22/52602, Method and Systems to Trickle Charge Electric Vehicle's Supercapacitors Using Solar Energy, Dec. 12, 2022.
U.S. Appl. No. 18/081,508, John Cronin, Retrofitting an Electric Vehicle With a Intelligent Supercapacitor Battery Unit, filed Dec. 14, 2022.
PCT/US22/52890, Retrofitting an Electric Vehicle With a Intelligent Supercapacitor Battery Unit, Dec. 14, 2022.
U.S. Appl. No. 18/092,028, John Cronin, Supercapacitor System With a on Board Computing and Charging Capability, filed Dec. 30, 2022.
PCT/US22/54386, Supercapacitor System With a on Board Computing and Charging Capability, Dec. 30, 2022.
U.S. Appl. No. 18/090,695, John Cronin, Supercapacitor System With an Over Voltage Protection Capability, filed Dec. 29, 2022.
PCT/US22/54226, Supercapacitor System With an Over Voltage Protection Capability, Dec. 28, 2022.
U.S. Appl. No. 18/091,369, John Cronin, Supercapacitor System With Temperature Control, filed Dec. 30, 2022.
PCT/US22/54334, Supercapacitor System With Temperature Control, Dec. 30, 2022.
"200-MHz 16×16 Video Crosspoint Switch IC," Analogue Dialogue, Apr. 1997, vol. 31, No. 2, 25 pages; https://www.analog.com/en/analog-dialogue/articles/200-mhz-16x16-video-crosspoint-switch-ic.html.
"8×8 Analog Crosspoint Switches Analog & Digital Crosspoint ICs," Mouser Electronics, [Downloaded on Internet: Feb. 21, 2023], 5 pages, https://www.mouser.com/c/semiconductors/communication-networking-ics/analog-digital-crosspoint-ics.
Camara et al., "Polynomial Control Method of DC/DC Converters for DC-Bus Voltage and Currents Management—Battery and Supercapacitors," IEEE Transaction on Power Electronics, vol. 27, No. 3 (Mar. 2012): 1455-1467, DOI: 10.1109/TPEL.2011.2164581.
Crossbar Switch—Wikipedia, [Downloaded from Internet: Feb. 21, 2023], 7 pages; https://en.wikipedia.org/wiki/Crossbar_switch.
Danila et al., Elena; "Dynamic Modelling of Supercapacitor Using Artificial Neural Network Technique," International Conference and Exposition on Electrical and Power Engineering, Oct. 2014, DOI: 10.1109/ICEPE.2014.6969988 and https://www.researchgate.net/publication/270888480_Dynamic_Modelling_of_Supercapacitor_Using_Artificial_Neural_Network_Technique.
"Details, datasheet, quote on part No. BQ24640RVAR—High Efficienty Synchronous Switch-Mode Battery Charge Controller for Super Capacitors," Texas Instruments, SLUSA44A—Mar. 2010—Revised Jul. 2015, 31 pages, https://www.digchip.com/datasheets/%203258066-bq24640rvar.html.
"Digital Crosspoint Switches," MicroSemi Corp. (Aliso Viego, CA), [Downloadaed from Internet Feb. 21, 2023], 2 pages, https://www.microsemi.com/product-directory/signal-integrity/3579-digital-crosspoint-switches.
Eddahech et al., Akram; "Modeling and adaptive control for supercapacitor in automotive applications based on artificial neural networks," Electric Power Systems Research, vol. 106 (Jan. 2014): 134-141, https://www.sciencedirect.com/science/article/abs/pii/S0378779613002265.
Ge et al., Yuru; "How to measure and report the capacity of electrochemical double layers, supercapacitors, and their electrode materials," Journal of Solid State Electrochemistry, vol. 24 (2020): 3215-3230, https://link.springer.com/article/10.1007/s10008-020-04804-x.
Haddoun, Abdelhakim; "Modeling, Analysis, and Neural Network Control of an EV Electrical Differential," IEEE Transactions on Industrial Electronics, vol. 55, No. 6 (Jun. 2008): 2286-94, https://www.researchgate.net/publication/3219993.
Lin et al., Tianquan; "Nitrogen-doped mesoporous carbon of extraordinary capacitance for electrochemicalenergy storage," Science (new series), vol. 350, No. 6267 (Dec. 18, 2015): 1508-1513https://www.jstor.org/stable/24741499.
Marie-Francoise et al., Jean-Noel; "Supercapacitor modeling with Artificial Neural Network (ANN)," 2004, https://www.osti.gov/etdeweb/servlets/purl/20823689.
"Micrel™ 2.5V/3.3V 3.0 GHz Dual 2×2 CML Crosspoint Switch w/ Internal Termination, SuperLite™ SY55858U," Nov. 2005, 8 pages, http://ww1.microchip.com/downloads/en/DeviceDoc/sy55858u.pdf.
Surewaard et al., Erik; "A Comparison of Different Methods for Battery and Supercapacitor Modeling," SAE Transactions, Journal of Engines, vol. 112, Section 3 (2003): 1851-1859, https://www.jstor.org/stable/44741399.
"Testing Super-Capacitors, Part 1: CV, EIS, and Leakage Current," Apr. 16, 2015, 11 pages, https://www.gamry.com/assets/Uploads/Super-capacitors-part-1-rev-2.pdf.
"Testing Electrochemical Capacitors Part 2—Cyclic Charge Discharge and Stacsk," Nov. 14, 2011, 11 pages; https://www.gamry.com/assets/Application-Notes/Testing-Super-Capacitors-Pt2.pdf.
"Understanding Tree and Crosspoint Matrix Architectures." Pickering Test, [Downloaded from Internet: Feb. 21, 2023], 7 pages,

(56) References Cited

OTHER PUBLICATIONS https://www.pickeringtest.com/en-us/kb/hardware-topics/switching-architectures/understanding-tree-and-crosspoint-matrix-architectures.
U.S. Appl. No. 18/079,841, Office Action dated Mar. 22, 2024.
U.S. Appl. No. 18/081,508, Office Action dated Apr. 9, 2024.
PCT Application No. PCT/US2022/048287, International Preliminary Report on Patentability dated May 10, 2024.
PCT Application No. PCT/US2022/051865, International Preliminary Report on Patentability dated Jun. 13, 2024.
PCT Application No. PCT/US2022/051863, International Preliminary Report on Patentability dated Jun. 13, 2024.
PCT Application No. PCT/US2022/051867, International Preliminary Report on Patentability dated Jun. 13, 2024.
PCT Application No. PCT/US2022/51870, International Preliminary Report on Patentability dated Jun. 13, 2024.
PCT Application No. PCT/US2022/051881, International Search Report and Written Opinion dated May 26, 2023.
PCT Application No. PCT/US2022/051881, International Preliminary Report on Patentability dated Jun. 13, 2024.
PCT Application No. PCT/US2022052033, International Preliminary Report on Patentability dated Jun. 20, 2024.
PCT Application No. PCT/US2022/052034, International Preliminary Report on Patentability dated Jun. 20, 2024.
PCT Application No. PCT/US2022/052045, International Preliminary Report on Patentability dated Jun. 20, 2024.
PCT Application No. PCT/US2022/052054, International Preliminary Report on Patentability dated Jun. 20, 2024.
PCT Application No. PCT/US2022/052035, International Preliminary Report on Patentability dated Jun. 20, 2024.
PCT Application No. PCT/US2022/052036, International Preliminary Report on Patentability dated Jun. 20, 2024.
PCT Application No. PCT/US2022/052049. International Preliminary Report on Patentability dated Jun. 20, 2024.
PCT Application No. PCT/US2022/052602, International Preliminary Report on Patentability dated Jun. 20, 2024.
PCT Application No. PCT/US2022/052890, International Preliminary Report on Patentability dated Jun. 27, 2024.
PCT Application No. PCT/US2022/054386, International Preliminary Report on Patentability dated Jul. 11, 2024.
PCT Application No. PCT/US2022/054226, International Preliminary Report on Patentability dated Jul. 11, 2024.
PCT Application No. PCT/US2022/054334, International Preliminary Report on Patentability dated Jul. 11, 2024.
PCT Application No. PCT/US22/51881 Invitation to Pay Additional Fees dated Mar. 2, 2023.
PCT Application No. PCT/US2022/051867 International Search Report and Written Opinion dated Mar. 7, 2023.
PCT Application No. PCT/US22/52033 International Search Report and Written Opinion dated Mar. 8, 2023.
PCT Application No. PCT/US22/52049 International Search Report and Written Opinion dated Mar. 8, 2023.
PCT Application No. PCT/US2022/048287 International Search Report and Written Opinion dated Mar. 10, 2023.
PCT Application No. PCT/US22/52035 International Search Report and Written Opinion dated Mar. 14, 2023.
PCT Application No. PCT/US2022/051863 International Search Report and Written Opinion dated Mar. 17, 2023.
PCT Application No. PCT/US22/52034 International Search Report and Written Opinion dated Mar. 20, 2023.
PCT Application No. PCT/US22/52890 International Search Report and Written Opinion dated Mar. 20, 2023.
PCT Application No. PCT/US22/52045 International Search Report and Written Opinion dated Mar. 21, 2023.
PCT Application No. PCT/US22/52036 International Search Report and Written Opinion dated Mar. 30, 2023.
PCT Application No. PCT/US22/52602 International Search Report and Written Opinion dated Apr. 4, 2023.
PCT Application No. PCT/US22/51870 International Search Report and Written Opinion dated Apr. 5, 2023.
PCT Application No. PCT/US22/54334 International Search Report and Written Opinion dated Apr. 5, 2023.
PCT Application No. PCT/US22/54386 International Search Report and Written Opinion dated Apr. 12, 2023.
PCT Application No. PCT/US22/54226 International Search Report and Written Opinion dated Apr. 18, 2023.
PCT Application No. PCT/US2022/051865 International Search Report and Written Opinion dated May 2, 2023.
Sarwar et al. "Experimental analysis of Hybridised Energy Storage Systems for automotive applications." Journal of Power Sources 324 (2016): 388-401. Aug. 30, 2016 (Aug. 30, 2016) Retrieved on Feb. 11, 2023 (Feb. 11, 2023) from <https://www.sciencedirect.com/science/article/abs/pii/S0378775316306784>.
PCT Application No. PCT/US2022/052054, International Search Report and Written Opinion dated Feb. 5, 2024.
Kokate et al., "Retrofitting of Auto Rickshaw to E-Rickshaw—A Feasibility Study", 2020 First International Conference on Power, Control and Computing Technologies (ICPC2T), IEEE, URL: https://ieeexplore.ieee.org/stamp/stamp.jsp7tp=&amumber=9071492> entire document.
U.S. Appl. No. 18/075,333, Office Action dated Sep. 25, 2024.
U.S. Appl. No. 18/075,338, Office Action dated Nov. 6, 2024.
U.S. Appl. No. 18/076,259, Office Action dated Sep. 13, 2024.
Tesla, Model S Owner's Manual, May 16, 2019.

\* cited by examiner

MONITORING AND MANAGING TEMPERATURE OF POWER PACKS

CROSS-REFERENCE TO RELATED APPLICATIONS

The present patent application claims the priority benefit of U.S. provisional patent application No. 63/285,885 filed Dec. 3, 2021, the disclosure of which is incorporated by reference herein.

BACKGROUND OF THE INVENTION

1. Field of the Technology

The present disclosure generally relates to heat energy management techniques used for power packs and particularly relates to a system and a method for monitoring and managing temperature of power packs.

2. Description of the Related Art

Electric vehicles (EVs) technologies have grown and evolved exponentially in recent years, and a need for monitoring and managing temperature of power packs in the EVs has also greatly increased over the recent years. EVs, also referred to as battery EVs, generally use a battery pack to store electrical energy that powers a motor of an EV. Further, electric vehicle battery packs are charged by plugging the vehicle into an electric power source. This electric power source may include an external power source or a power charging station. In recent years, there has been a huge increase in the use of electric propulsion in road transport applications, with internal combustion engine hybrid, battery-electric, and fuel cell vehicles with spark-ignition engine hybrids being the most common. This has opened up an opportunity for regenerative braking, whereby the kinetic energy of a vehicle is converted and stored into electrical energy during braking and recycled to reduce fuel consumption in diesel and fuel cell vehicles and extend the range in battery electric vehicles. In order to make use of this source of power, it is necessary to have monitoring and managing of temperature, generally in the battery packs and supercapacitor power packs so as to avoid release of excessive heat due to thermal runaway. Batteries are a popular choice due to the widespread use of batteries in hybrid and electric vehicles.

There have been many technologies developed in recent years, which were implemented in EVs to monitor and manage power packs of the electric vehicle in order to reduce thermal runaway. One of these technologies involves an active temperature control method to equalize the temperature distribution of the power packs of lithium-ion batteries. Some attempts involve improving an unbalanced thermal problem by optimally arranging battery cells and controlling the coolant flow rate. However, one drawback to such approaches is that current lithium battery packs nevertheless produce a lot of heat, which causes an increase in the overall temperature of a battery pack, especially in cases of higher operating current conditions. Generally, excessive heat originates from the electrochemical reactions, mixing, and the phase change occurring in the lithium-ion cell. Further, excessive heat is also generated due to Joule heating effect, which may damage the lithium battery pack.

Another technology involves the use of a battery thermal management system (BTMS) to maintain the temperature of battery cells in a pack at an optimal range by sustaining the temperature gradient within a relatively narrow range. Some battery thermal management systems adopted in EVs are air-based BTMS, liquid-based BTMS, and phase change-based BTMS. These systems can be integrated to get a hybrid system. Air-based cooling systems may be used at low charging/discharging rates and nominal ambient conditions. However, at higher operating conditions like high charging/discharging, high ambient temperature, and so forth, the air-based cooling systems may be unable to maintain the battery within the desired operating temperature range. Compared to air cooling systems, liquid-based cooling systems and phase-based cooling systems may offer better cooling performance for a similar parasitic load. But a drawback of liquid-based cooling systems and phase-based cooling systems is their complexity and coolant leakage issues, which may lead to abrupt variations in temperature of the power packs of the battery, thereby leading to damage of the battery pack of these systems.

Therefore, there is a need for an efficient, convenient, and economical system for monitoring power packs and effectively initiating temperature management of the battery pack of the electric vehicle.

SUMMARY OF THE CLAIMED INVENTION

Embodiments of the present invention include systems and methods for monitoring and managing temperature of power packs. Thermal energy associated with a set of supercapacitor power packs integrated with an electric motor may be monitored via one or more sensors. Information may received at a connection interface as sent from the sensors regarding a current measurement of thermal energy associated with the set of supercapacitor power packs. A thermal event associated with the set of supercapacitor power packs may be detected based on the received measurement of thermal energy. It may be determined that the detected thermal event is associated with a charging status. The determined charging status may be initiated in relation to the set of supercapacitor power packs.

DETAILED DESCRIPTION

Embodiments of the present invention include systems and methods for monitoring and managing temperature of power packs. Temperature sensors may be used to monitor current temperatures of the power packs. Thermal energy associated with a set of supercapacitor power packs integrated with an electric motor may be monitored via one or more sensors. Information may received at a connection interface as sent from the sensors regarding a current measurement of thermal energy associated with the set of supercapacitor power packs. A thermal event associated with the set of supercapacitor power packs may be detected based on the received measurement of thermal energy. It may be determined that the detected thermal event is associated with a charging status. The determined charging status may be initiated in relation to the set of supercapacitor power packs.

Figure 1A:
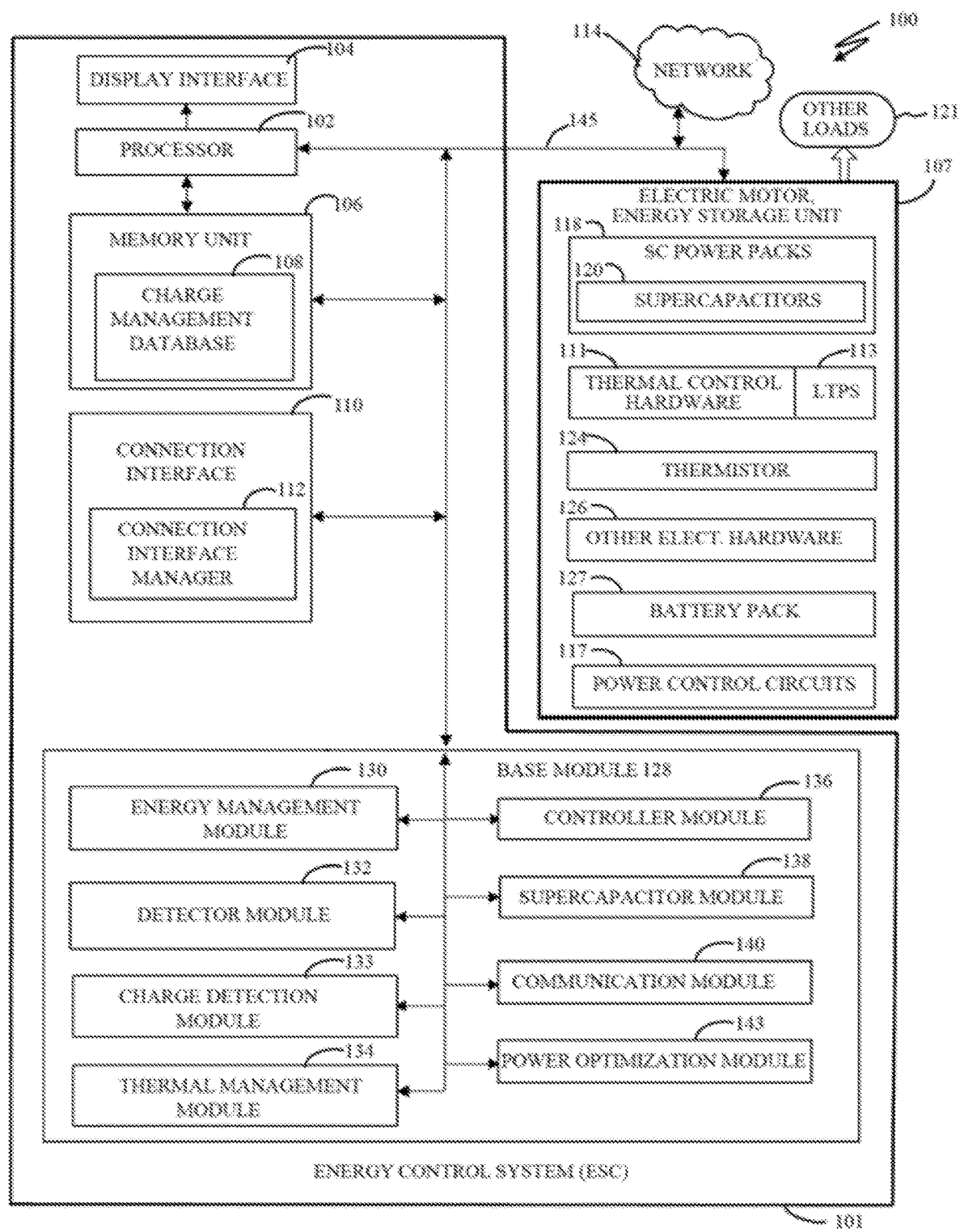
FIG. 1A illustrates an exemplary network environment in which a system for monitoring and temperature management of power packs may be implemented.

FIG. 1A illustrates an exemplary network environment 100 in which a system for monitoring and temperature management of power packs may be implemented. The network environment 100 may include an energy control system (ECS) 101, which may comprise or be operably associated with a processor 102 that is coupled with a display interface 104. Further, the processor 102 may be coupled with a memory unit 106 having an charge management database 108, a connection interface 110 comprising a connection interface manager 112, and a base module 128 (comprising energy management module 130, detector module 132, charge detection module 133, thermal management module 134, controller module 136, supercapacitor module 138, communication module 140, and power optimization module 143).

The ECS 101 may further be in communication with energy storage unit 107, as well as other loads 121, via communication network 114. As illustrated energy storage unit 107 may include one or more supercapacitor power packs 118 of one or more supercapacitors 120, thermal control hardware 111, low temperature power source (LTPS) 113, thermistor 124, other electrical hardware 126, battery pack 127, and power control circuits 117.

The energy control system (ECS) 101 may be a combination of hardware and software that manages various aspects of the ESU 107, including energy delivery. The ECS 101 regulates the energy storage unit (ESU) 107 to control discharging, charging, and other features as desired, such as temperature, safety, efficiency, etc. ECS 101 may exercise individual control over each power pack or optionally over each supercapacitor or grouped supercapacitor unit of ESU 107 in order to efficiently tap the available power of individual supercapacitors and to properly charge individual supercapacitors rather than merely providing a single level of charge for the ESU 107 as a whole that may be too little or too much for individual supercapacitors or their power packs.

The processor 102 may comprise one or more microchips or other systems for executing electronic instructions and can provide instructions to regulate the charging and discharging hardware and, when applicable, the configuration hardware or other aspects of the ESU 107, and/or other aspects of the ECS 101 and its interactions with the device, the cloud, etc. In some cases, a plurality of processors 102 may collaborate, including processors installed with the ESU and processors 102 installed in a vehicle or other device.

The processor 102 may be operably associated with an electric motor that comprises or is operably associated with an energy storage unit (ESU) 107. Processor 102 may be responsible for performing various operations by executing various modules as described below in detail. Further, the processor 102 may be configured to control the operation of charging and discharging the battery pack 127 of the electric vehicle.

The display interface 104 of the associated ESC may comprise a graphic user interface, such the vehicle's control panel (e.g., a touch panel), as well as associated with one or more microphones and speakers for exchanging audio information with a user (e.g., who may provide verbal input or commands). The display interface 104 may be displayed on or in the device, such as on a touchscreen or other display in a vehicle or on the device, or it may be displayed by a separate device such as the user's phone.

In one embodiment, the display interface 104 may be integrated within the electric vehicle to display charging and discharging (e.g., of the supercapacitor power packs 118). In one embodiment, the display interface 104 may include, but not limited to, a video monitoring display, a smartphone, a tablet, and alike, and may employ any combination of sound or voice, text, graphical representations, video, haptic or tactile representation of information, physical motion or actions, etc., for providing information and receiving user instructions.

The display interface 104 may be displayed on the ESU 107 itself or on a surface connected to or in communication with the ESU 107. In one version, the display interface 104 may include but is not limited to a video monitoring display, a smartphone, a tablet, and the like, each capable of displaying a variety of parameters and interactive controls, but the display interface 104 could also be as simple as one or more lights indicating charging or discharging status and optionally one or more digital or analog indicators showing remaining useful lifetime, % power remaining, voltage, etc. In some aspects, the display interface provides graphical information on charge status including one or more of fraction of charge remaining or consumed, remaining useful life of the ESU 107 or its components (e.g., how many miles of driving or hours of use are possible based on current or projected conditions or based on an estimate of the average conditions for the current trip or period of use).

Display interface 104 may be configured to display the charge level of the supercapacitor power packs 118 of the electric vehicle. Further, the display interface 104 may be configured to display the charging rate or discharging rate of the electric motor ESU 107 and the supercapacitor power packs 118 of the electric vehicle. In one embodiment, the display interface 104 is configured to display the charge level of the electric motor ESU 107 and information related to the charge level required for a battery pack 127.

Display interface 104 may also provide one or more user controls to allow selection of settings. Such settings may include low, medium, or high values for efficiency, power, etc.; adjustment of operating voltage when feasible; safety settings (e.g., prepare the ESU 107 for shipping, discharge the ESU 107, increase active cooling, only apply low power, etc.); planned conditions for use (e.g., outdoors, high-humidity, in rain, underwater, indoors, etc.). Selections may be made through menus and/or buttons on a visual display, through audio "display" of information responsive to verbal commands, or through text commands or displays transmitted to a phone or computer, including text messages or visual display via an app or web page. Thus, the ECS 101 may comprise a display interface 104 coupled to the processor 102 to continuously display the status of charging and discharging the plurality of power packs of ESU 107.

The memory 106 may comprise coding for operation of one or more of the ECS modules and their interactions with each other or other components. It may also comprise information such as databases pertaining to any aspect of the operation of the ECS, though additional databases may also be available via the cloud (e.g., communication network 114). Such databases can include a charge management database 108 that describes various charge management parameters relating to the charging and/or discharging characteristics of a plurality or all of the energy sources (the power packs and the batteries or other energy storage units), for guiding charging and discharging operations. Such data may also be included with energy-source-specific data provided by or accessed by the energy source modules.

The memory 106 may in one or more locations or components such as a memory chip, a hard drive, a cloud-based source or other computer readable medium, and may be in any useful form such as flash memory, EPROM, EEPROM, PROM, MROM, etc., or combinations thereof and in consolidated (centralized) or distributed forms. The memory may in whole or in part be read-only memory (ROM) or random-access memory (RAM), including static RAM (SRAM), dynamic RAM (DRAM), synchronous dynamic RAM (SDRAM), and magneto-resistive RAM (MRAM), etc.

The charge management database 108 may be configured to store information related to the supercapacitor power packs 118 used while charging or discharging. In one embodiment, the charge management database 108 may be configured to store information related to the thermal power cycle of each of the supercapacitor power packs 118, the maximum and minimum charge for a different type of the supercapacitor power packs 118, thermal state of charge (SoC) profile of each of the supercapacitor power packs 118, the heat flux density of the supercapacitor power packs 118, the thermal conductivity of the supercapacitor power packs 118, thermal power of the supercapacitor power packs 118, the temperature of the supercapacitor power packs 118 and thermal efficiency of the supercapacitor power packs 118.

Further, the charge management database 108 may be configured to store information related to temperature management of the supercapacitor power packs 118 and the battery pack 127 of the electric vehicle (not shown). In one embodiment, the information may include but is not limited to, the type of power pack to be charged, bidirectional charging of each of the supercapacitor power packs 118, energy presently available in the battery pack 127 of the electric vehicle, the minimum energy required in the battery pack 127 of the electric vehicle, and the power capacity of the electric motor. In another embodiment, the stored information may also include, but is not limited to, the capacity of each of the supercapacitor power packs 118, amount of charge required for one trip of the electric vehicle along a path, charging required for the battery pack 127 of the electric vehicle, amount of power transfer from the electric motor to the battery pack 127 of the electric vehicle and acceleration and deceleration data related to the path of the electric vehicle.

In another embodiment, the charge management database 108 may provide a detailed research report for average thermal energy consumption by the supercapacitor power packs 118 of the electric vehicle over the path. In one embodiment, the charge management database 108 may be configured to store information of the consumption of the electric charge per unit per kilometer drive of the electric vehicle from the supercapacitor power packs 118. For example, the electric vehicle may installed with 15 supercapacitor batteries coupled in series, wherein each lithium battery will supply 120 Watts (W) of the power for a duration of one hour to drive the electric vehicle for a distance of one kilometer an average speed of, say, 20 m/s$^2$.

Charge management database 108 may also be of use in describing the characteristics of an external power source that will be used to charge the ESU. Knowledge of the characteristics of the external charge can be used to prepare for impedance matching or other measures needed to handle a new input source to charge the ESU, and with that data the external power can be received with reduced losses and reduced risk of damaging elements in the ESU by overcharge, excessive ripple in the current, etc.

Connection interface 110 provides for communications within a vehicle or between the ECS 101 or ESU 107. Connection interface 110 may be a hardwired communication bus to all the components in the system that can allow data to be sent and received. There may be components that could be interfaced by wireless communications on the network interface, or hardwired communication bus on a communications bus, or hybrids of both wireless communications and hardwired communications bus. For example, connection interface 110 may involve a DC bus or other means such as separate wiring. Any suitable protocol may be used, including UART, LIN (or DC-LIN), CAN, SPI, I2C (including Intel's SMBus), and DMX (e.g., DMX512). In general, communications from the ECS 101 or ESU 107 with a device may be over a DC bus or, if needed, over an AC/DC bus, or by separately wired pathways if desired, or may be wireless. Useful transceivers for communicating over DC lines include, for example, the SIG family and DCB family of transceivers from Yamar Electronics, LTD (Tel Aviv, Israel), and Yamar's DCAN500 device for CAN2.0 A/B protocol messages.

Communication to the cloud may involve a wired or a wireless connections of connection interface 110. If wireless, various communication techniques may be employed such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques.

Connection interface 110 may be used for facilitating connection of the plurality of supercapacitors 120 in the supercapacitor power packs 118 and the connection of the supercapacitors 120 with the electric motor. The connection interface 110 may comprise the connection interface manager 112, which enables the connection interface 110 to manage the connection of the plurality of supercapacitors 120 in the battery pack 127 or the connection of the plurality of supercapacitors 120 with the electric motor. For instance, there may be 10 supercapacitors connected with the electric motor, but there can be a maximum of 30 supercapacitors that can be connected with the electric motor. This possibility of connection of one component with the other component is managed by the connection interface manager 112.

Further, the processor 102 may be communicatively coupled to a connection interface 110 for communication via communication network 114 with outside entities and data sources (e.g., an administrator, fleet management tools, vehicle databases, maintenance services, external memory, etc.). The ECS 101 may communicate not only with the cloud 114 or other aspects of the vehicle, but also to communicate with central systems or other vehicles, when desired. In such cases, a fleet of vehicles may be effectively monitored and managed to improve energy efficiency and track performance of vehicles and their ESUs 107, thereby providing information that may assist with maintenance protocols, for example.

The ECS 101 may further involve information received from and/or provided to one or more databases and a message center. The message center can be used to provide alerts to an administrator responsible for the ESU 107 and/or the electric vehicle or other device. For example, an entity may own a fleet of electric vehicles using ESUs 107, and may wish to receive notifications regarding usage, performance, maintenance issues, and so forth. The message center may also participate in authenticating the ESU 107 or verifying its authorization for use in the electric vehicle or other device (not shown) via interaction with a security module.

Communications in network environment 100 may occur wirelessly or through the cloud 114 via a connection interface 110, and may share information with various central databases, or access information from databases to assist with the operation of the vehicle and the optimization of the ESU 107, for which historical data may be available in a database. Databases of use with the ECS 101 include databases on the charge and discharge behavior of the energy sources in the ESU 107 in order to optimize both charging and discharging in use based on known characteristics, databases of topographical and other information for a route to be taken by the electric vehicle or an operation to be performed by another device employing the ESU 107, wherein the database provides guidance on what power demands are to be expected in advance in order to support anticipatory power management wherein the status of energy sources and the available charge is prepared in time to deliver the needed power proactively.

The ECS 101 may access various databases via an interface 110 to the cloud 114 and store retrieved information in the memory for use to guide the various modules. Further, the memory 106 may locally store a charge management database 108 or manage storage in conjunction with one or more databases residing in the cloud 114. In one aspect, the charge management database 108 may be configured to store information related to various power packs 118 used while charging and discharging from the ESU 107. In one aspect, the charge management database 108 may be configured to store information related to the power cycle of each of the plurality of power packs 118, the maximum and minimum charge for different types of power packs 118, and the state of charge (SoC) profile of each of the plurality of power packs 118.

The charge management database 108 may be configured to store information related to the management of the plurality of power packs 118 such as the type of power pack 118 to be charged, safety specifications, recent performance data, bidirectional charging requirements or history of each of the plurality of power packs, etc. In another aspect, the stored information may also include, but is not limited to, the capacity of each of the plurality of power packs, amount of charge required for one trip of the electric vehicle along the path, such as golf course, etc., charging required for a supercapacitor unit, etc. In another aspect, the charge management database 108 may provide a detailed research report for the electric vehicle's average electric charge consumption over a path. In one aspect, the charge management database 108 may be configured to store information of the consumption of the electric charge per unit per kilometer drive of the electric vehicle from the plurality of power packs. For example, such information may indicate that a golf cart is equipped with 5 supercapacitor-driven power packs each at 90% charge, with each power pack able to supply a specified amount of ampere hours (Ah) of electric charge resulting in an ability to drive under normal conditions at top speed for, say, 80 kilometers. The information may also indicate that a solar cell installed on the roof of the golf cart would, under current partly cloudy conditions, still provide enough additional charge over the planned period of use to extend the capacity of the ESU by another 40 kilometers for 1 passenger. The charge management database 108 may be used by the performance module for both reading data and storing new data on the individual energy storage units such as the power packs.

The energy storage unit (ESU) 107 is a device that can store and deliver charge. It may comprise one or more power packs 118, which in turn may comprise supercapacitors 120. The ESU 107 may also comprise batteries, hybrid systems, fuel cells, etc. Capacitance provided in the components of the ESU 107 may be in the form of electrostatic capacitance, pseudocapacitance, electrolytic capacitance, electronic double layer capacitance, and electrochemical capacitance, and a combination thereof, such as both electrostatic double-layer capacitance and electrochemical pseudocapacitance, as may occur in supercapacitors. The ESU may be associated with or comprise control hardware and software with suitable sensors (e.g., thermistor 124), as needed, in order for an energy control system (ECS) 101 to manage any of the following: temperature control, charging or discharging of the ESU 107, whether collectively or of any of its components, maintenance, interaction with batteries, battery emulation, communication with other devices, including devices that are directly connected, adjacent, or remote such as by wireless communication, etc. In some aspects, the ESU 107 may be portable and provided in a casing that also contains at least some components of the energy control system (ECS) 101, as well as features such as communication systems, a display interface 104, etc.

The energy storage unit (ESU) 107 is governed or controlled by the energy control system (ECS) 101, which may be adapted to optimize at least one of charging, discharging, temperature management, safety, security, maintenance, and anticipatory power delivery. The ECS 101 may communicate with a user interface such as a display interface 104 to assist in control or monitoring of the ESU 107 and also may comprise a processor and a memory. The ECS 101 may interact with the ESU 107 hardware such as the charging/discharging hardware and a temperature control system which not only provide data to the ECS 101, but are also response to directions from the ECS 101 for the management of the ESU 107.

The ECS 101 may interact with individual power packs 118 or supercapacitors 120 of ESU 107 through a crosspoint switch or other matrix systems. Further, the ECS 101 may obtain information from individual power packs or their supercapacitors through similar switching mechanisms or direct wiring in which, for example, one or more of a voltage detection circuit, an amperage detection circuit, a temperature sensor (e.g., thermistor 124), and other sensors or devices may be used to provide details on the level of charge and performance of the individual power pack or supercapacitor. The ECS 101 may therefore manage any or all of the following: temperature control, charging or discharging of the ESU 107, whether collectively or of any of its components, maintenance, interaction with batteries or battery emulation, and communication with other devices, including devices that are directly connected, adjacent, or remote such as by wireless communication.

The ECS 101 may govern specific types of energy storage devices of ESU 107, such as supercapacitors 120, lithium batteries. lead-acid batteries, and hybrid combinations of cooperative supercapacitor and battery. The ECS 101 may control such energy storage devices by executing software encoding algorithms for control such as for discharge or charging or managing individual energy sources, and may comprise or be operationally associated with hardware for redistributing charge among the energy sources to improve efficiency of the ESU 107, for monitoring charge via charge measurement systems such as circuits for determining the charge state of the respective energy sources, etc., and may comprise or be operationally associated with devices for receiving and sending information to and from the ECS 101 or its other modules, etc. The energy source modules may also cooperate with a charging module responsible for guiding the charging of the overall ESU 107 to ensure a properly balanced charge and a discharge module that guides the efficient discharging of the ESU 107 during use which may also seek to provide proper balance in the discharging of the energy sources. The ECS 101 may further manage changing requirements. In some aspects, ECS 101 may implement such controls by executing anticipatory algorithms that seek to predict upcoming changes in temperature and to adjust the state of the ECS 101 in order to be ready to more effectively handle.

ESC 107 may comprise supercapacitor power packs 118 and each supercapacitor power pack 118 may comprise a plurality of supercapacitors 120 connected in series and/or parallel. Further, the ESC 107 may comprise one or more thermistors 124 and other electrical hardware 126 such as insulated wire suitable for supercapacitors 120, safety systems, sensors (e.g., thermistor 124), crosspoint systems or matrix switches for access to individual supercapacitors, security systems for the protection and/or authentication of the ESU 107 or its associated supercapacitor power packs 118, etc.

The power pack 118 is a unit that can store and deliver charge within an energy storage unit, and comprises one or more supercapacitors 120 in series and/or parallel. Power pack 118 may further comprise or cooperate with temperature sensors (e.g., thermistor 124), charge and current sensors (circuits or other devices), connectors, switches such as crosspoint switches, safety devices, and control systems such as charge and discharge control systems. In various aspects described herein, the power pack 118 may comprise a plurality of supercapacitors and have an energy density greater than 200 kWhr/kg, 230 kWhr/kg, 260 kWhr/kg, or 300 kWhr/kg—such as from 200 to 500 kWhr/kg, or from 250 to 500 kWhr/kg. The power pack 118 may have a functional temperature range from −70° C. to 150° C., such as from −50° C. to 100° C. or from −40° C. to 80° C. The voltage provided by the power pack may be any practical value such as 3V or greater, such as from 3V to 240 V, 4V to 120 V, etc.

Supercapacitor 120 may include an ultracapacitor, which is an electrical component capable of holding hundreds of times more electrical charge quantity than a standard capacitor. This characteristic makes ultracapacitors useful in devices that require relatively little current and low voltage. In some situations, an ultracapacitor can take the place of a rechargeable low-voltage electrochemical battery.

Supercapacitor 120 (including ultracapacitor) typically have high power density, meaning they can charge up quickly and discharge quickly. The load curve of a chemical battery typically shows a high energy density, meaning such battery is very stable upon discharge (e.g., voltage does not change much over time for a given load) for long periods of time. This means that the chemical battery (lead acid or lithium ion etc) has a high energy density but they have a low power density, meaning they charge slowly. Ultracapacitors or supercapacitors 120 have been developed recently that have both a high power density (charge fast) and a high energy density (discharge slowly). An ultracapacitor or supercapacitor 120 that has both a high power density and a high energy density with a load discharge curve that resembles or comes close to a load discharge curve of a chemical battery, is ideal. As used herein, supercapacitor 120 refers generically to all forms of supercapacitors, but ideally one that has both high power density as well as high energy density.

By way of example, a power pack 118 may comprise one or more units each comprising at least one supercapacitor 120 having a nominal voltage from 2 to 12 V such as from 3 to 6 V, including supercapacitors 120 rated at about 3, 3.5, 4, 4.2, 4.5, and 5 V. For example, in discharge testing, a power pack 118 was provided and tested with 14 supercapacitors 120 in series and five series in parallel charged with 21,000 F at 4.2 V and had 68-75 Wh. Power packs 118 may be packaged in protective casings that allow them to be easily removed from an ESU 107 and replaced. Power packs 118 may also comprise connectors for charging and discharging. Power packs 118 may be provided with generally rectilinear casings or may have cylindrical or other useful shapes.

A supercapacitor 120 may have two electrode layers separated by an electrode separator wherein each electrode layer is electrically connected to a current collector supported upon an inert substrate layer; further comprising an electrolyte-impervious layer disposed between each electrode layer and each conducting layer to protect the conducting layer; and a liquid electrolyte disposed within the area occupied by the working electrode layers and the electrode separator. The liquid electrolyte may be an ionic liquid electrolyte gelled by a silica gellant or other gellant to inhibit electrolyte flow.

The supercapacitor 120 may comprise an electrode plate, an isolation film, a pole, and a shell, wherein the electrode plate comprises a current collector and a coating is disposed on the current collector. The coating may comprise an active material that may include carbon nanomaterial such as graphene or carbon nanotubes, including nitrogen-doped graphene, a carbon nitride, carbon materials doped with a sulfur compound such as thiophene or poly 3-hexylthiophene etc., or graphene on which is deposited nanoparticles of metal oxide such as manganese dioxide. The coating may further comprise a conductive polymer such as one or more of polyaniline, polythiophene and polypyrrole. Such polymers may be doped with a variety of substances such as boron (especially in the case of polyaniline). Nitrogen doping, for example, is described more fully by Tianquan Lin et al, "Nitrogen-doped mesoporous carbon of extraordinary capacitance for electrochemicalenergy storage," Science (new series), vol. 350, no. 6267 (18 Dec. 2015): 1508-1513, https://www.jstor.org/stable/24741499.

Electrodes in supercapacitors 120 may have thin coatings in electrical communication with a current collector. To provide high electrode surface area for high performance, electrodes may comprise porous material with high specific surface area such as graphene, graphene oxide, or various derivatives of graphene, carbon nanotubes or other carbon nanomaterials including activated carbon, nitrogen doped graphene or other doped graphene, graphite, carbon fiber-cloth, carbide-derived carbon, carbon aerogel, and/or may comprise various metal oxides such as oxides of manganese, etc., and all such materials may be provided in multiple layers and generally planar, cylindrical, or other geometries. Electrolytes in the supercapacitor 120 may include semi-solid or gel electrolytes, conductive polymers or gels thereof, ionic liquids, aqueous electrolytes, and the like. Solid-state supercapacitors 120 may be used.

Supercapacitors 120 may be provided with various indicators and sensors pertaining to charge state, temperature (e.g., thermistor 124), and other aspects of performance and safety. An actuation mechanism may be integrated to prevent undesired discharge. The voltage of an individual supercapacitor may be greater than 2 V such as from 2.5 V to 5 V, 2.7 V to 8 V, 2.5 V to 4.5 V, etc.

The ESU 107 may power a variety of electric vehicles and other transportation devices of all kinds, such as those for land, water, or air, whether adapted to operate without passengers or with one or more passengers. Electric vehicles may include automobiles, trucks, vans, recreational vehicles (RVs), fork lifts, carts such as golf carts or baby carts, motorcycles, electric bikes scooters, autonomous vehicles, mobile robotic devices, hoverboards, monowheels, Segways® and other personal transportation devices, wheelchairs, drones, personal aircraft for one or more passengers and other aeronautical devices, robotic devices, aquatic devices such as boats or personal watercraft such as boats, Jet Skis®, diver propulsion vehicles or underwater scooters, and the like, etc. The electric vehicle generally comprises one or more motors connected to the ESU 107, and an energy control system (ECS) 101 that controls the power delivered from the ESU 107, and may comprise a user interface that provides information and/or control regarding the delivery of power from the ESU 107, as well as information regarding performance, remaining charge, safety, maintenance, security, etc. Not all transportation devices require non-stationary motors. An elevator, for example, may have a substantially stationary motor while the cabin moves between level of a structure. Other transport systems with mobile cabins, seats, or walkways may be driven by stationary motors driving cables, chains, gears, bands, etc.

Apart from electric vehicles, there are many other devices that may be powered by the ESU 107 in cooperation with the ESC 101. Such other devices can include generators, which in turn can power an endless list of electric devices in households and industry. ESUs 107 of various size and shape can also be integrated with a variety of motors, portable devices, wearable or implantable sensors, medical devices, acoustic devices such as speakers or noise cancellation devices, satellites, robotics, heating and cooling devices, lighting systems, rechargeable food processing tools and systems of all kinds, personal protection tools such as tasers, lighting and heating systems, power tools, computers, phones, tablets, electric games, etc. In some versions, the device being powered is the grid, and in such versions, the ESU 107 may comprise an inverter to turn DC current into AC current suitable for the grid.

In some aspects, a plurality of devices such as electric vehicles may be networked together via a cloud-based network 114, wherein the devices share information among themselves and/or with a central message center such that an administrator can assist in managing the allocation of resources, oversee maintenance, evaluate performance of vehicles and ESUs 107, upgrade software or firmware associated with the ESC 101 to enhance performance for the particular needs of individual users or a collective group, adjust operational settings to better cope with anticipated changes in weather, traffic conditions, etc., or otherwise optimize performance.

When installed in electric vehicles, the ESU 107 may comprise both powerpacks 118, as well as one or more lead-acid batteries or other batteries. The ESU 107 may power both the motor as well as the on-board power supply system. Any kind of electric motor may be power by the ESU. The major classes of electric motors are: 1) DC motors, such as series, shunt, compound wound, separately excited (wherein the connection of stator and rotor is done using a different power supply for each), brushless, and PMDC (permanent magnet DC) motors, 2) AC motors such as synchronous, asynchronous, and induction motors (sometimes also called asynchronous motors), and 3) special purpose motors such as servo, stepper, linear induction, hysteresis, universal (a series-wound electric motor that can operate on AC and DC power), and reluctance motors.

Temperature and other properties of the power packs may be continuously monitored by various thermal sensors (e.g., thermistors 124, thermocouples, infrared sensors, etc.) to detect the emergence of potentially harmful hotspots, or to ensure that the supercapacitors 120 are operating at an acceptable temperature. The sensors may include thermocouples, thermistors 124, or other devices associated with temperature measurement such as IR cameras, etc., as well as strain gauges, pressure gauges, load cells, accelerometers, inclinometers, velocimeters, chemical sensors, photoelectric cells, cameras, etc., that can measure the status of the power packs or batteries or other energy storage units, or other characteristics of the ESU 107 or the device as described more fully hereafter. The sensors may comprise sensors physically contained in or on the ESU 107, or also comprise sensors mounted elsewhere such as engine gauges that are in electronic communication with the ESU 107 or its associated ECS 101.

For local or system overheating, the thermal control hardware 111 in cooperation with the thermal management module 134 may activate and operate various cooling mechanisms such as fans, Peltier effect coolers, heat pipes, forced liquid flow systems with heat transfer liquids, fins, etc., to cool overheated regions, while the thermal management module 134 may also acting in cooperation with charging and discharging hardware and control systems to reduce the charging or discharging of individual supercapacitors 120 to reduce the sources of overheating.

The thermal management module 134 may also assist in coping with cold weather by providing heating when temperatures of supercapacitors 120 are below the useful temperature range or too cold to provide a needed level of charge for starting or other demanding actions (e.g., at temperatures less than −10° C., −20° C., −30° C., etc.). In such cases, electrical power from a low temperature power source (LTPS) 113 that is part of or operably associated with the thermal control hardware 111 and/or responsive to the thermal management module 134 may be applied from the LTPS 113 to one or more supercapacitors in either the motor-mounted supercapacitor power packs or the secondary supercapacitor power packs or both in order to bring sufficient power packs up to a required temperature in order to start the engine or perform other operations. The LTPS 113 may be a relatively expensive low-temperature power source relative to the supercapacitors and batteries elsewhere in the ESU, and may include supercapacitors such as solid-state supercapacitors; supercapacitors with low-temperature ionic fluid electrolytes; low-temperature supercapacitors with foam or aerogel structures; low-temperature lithium-ion polymer batteries that operate at −50° C.; and LiFePO4 batteries. Combustible fuels such as butane, propane, gasoline, kerosene, etc. may also be used for temporary heating.

The charging and discharging hardware comprises the wiring, switches, charge detection circuits, current detection circuits, and other devices for proper control of charge applied to the power packs or to the batteries or other energy storage units as well temperature-control devices such as active cooling equipment and other safety devices, though this may instead be associated with a thermal management module 134 and thermal control hardware 111 that may be operably associated with the charging and discharging hardware. Active cooling devices (not shown) may include fans, circulating heat transfer fluids that pass through tubing or in some cases surround or immerse the power packs, thermoelectric cooling such as Peltier effect coolers, etc.

In order to charge and discharge an individual unit among the power packs 118 to optimize the overall efficiency of the ESU 107, methods are needed to select one or more of many units from what may be a three-dimensional or two-dimensional array of connector to the individual units. Any suitable methods and devices may be used for such operations, including the use of crosspoint switches or other matrix switching tools. Crosspoint switches and matrix switches are means of selectively connecting specific lines among many possibilities, such as an array of X lines (X1, X2, X3, etc.) and an array of Y lines (Y1, Y2, Y3, etc.) that may respectively have access to the negative or positive electrodes or terminals of the individual units among the power packs as well as the batteries or other energy storage units 107. SPST (Single-Pole Single-Throw) relays, for example, may be used. By applying charge to individual supercapacitors within powerpacks or to individual power packs within the ESU 107, charge can be applied directly to where it is needed, and power pack 118 or supercapacitor 120 can be charged to an optimum level independently of other power packs 118 or supercapacitors 120.

The ESU 107 may be capable of charging, or supplementing the power provided from the batteries or other energy storage units 107 including chemical and nonchemical batteries, such as but not limited to lithium batteries (including those with titanate, cobalt oxide, iron phosphate, iron disulfide, carbon monofluoride, manganese dioxide or oxide, nickel cobalt aluminum oxides, nickel manganese cobalt oxide, etc.), lead-acid batteries, alkaline or rechargeable alkaline batteries, nickel-cadmium batteries, nickel-zinc batteries, nickel-iron batteries, nickel-hydrogen batteries, nickel-metal-hydride batteries, zinc-carbon batteries, mercury cell batteries, silver oxide batteries, sodium-sulfur batteries, redox-flow batteries, supercapacitor batteries, and combinations or hybrids thereof.

The ECS 101 may optimize various aspects about the way in which each unit within the power packs 118 or batteries 127 or other energy storage units 107 is used both in terms of charging and delivering charge. For example, ECS 101 may seek to provide useful work from as much of the charge as possible in the individual power packs while ensuring during charging that individual power packs are fully charged but not damaged by overcharging or certain temperatures. ECS 101 can assist in directing the charging/discharging hardware. In one aspect, the ESU 107 thus may provide real-time charging and discharging of the plurality of power packs 118 while the electric vehicle is continuously accelerating and decelerating along a path. ECS 101 may be configured to charge or discharge each of the plurality of power packs up to a threshold limit. For example, under one set of conditions, the threshold limit may be more than 90 percent capacity of each of the plurality of power packs 118.

The ECS 101 or central systems in communication with the ECS 101 may employ machine learning, including neural networks and AI systems, to learn performance profiles for individual powerpacks, supercapacitors, or entire ESUs, or those of a managed fleet of vehicles of collection of devices, in order to better estimate and optimize performance including such factors as remaining charge, remaining useful life, times for maintenance, methods for charge control to reduce overheating or to prevent other excursions or safety issues, and strategies to optimize lifetime or power delivery with a given ECS 101. Methods for adaptive learning, neural network analysis, or AI development can be used with supercapacitor systems or the ESUs 107 described herein. Controller 136 may also be adapted to perform machine learning and to constantly learn from situations faced. In related aspects, the processor and the associated software form a "smart" controller based on machine learning or artificial intelligence adapted to handle a wide range of input and a wide range of operational demands.

ECS 101 assists in coping with changes in operation including acceleration, deceleration, stops, changes in slops (uphill or downhill), changes in traction or properties of the road or ground that affect traction and performance, etc., by optimizing the delivery of power or the charging that is taking place for individual power packs or batteries or other energy storage units. In addition to guiding the degree of power provided by or to individual power packs based on current use of the device and the individual state of the power packs, in some aspects ECS 101 provides anticipatory management of the ESU 107 by proactively adjusting the charging or discharging states of the power packs such that added power is available as the need arises or slightly in advance (depending on time constants for the ESU and its components, anticipatory changes in status may only be needed for a few seconds (e.g., 5 seconds or less or 2 seconds or less) or perhaps only for 1 second or less such as for 0.5 seconds or less, but longer times of preparatory changes may be needed in other cases, such as from 3 seconds to 10 seconds, to ensure that adequate power is available when needed but that power is not wasted by changing the power delivery state prematurely. This anticipatory control can involve not only increase the current or voltage being delivered, but can also involve increasing the cooling provided by the cooling hardware of the charging and discharging hardware in cooperation with safety module and when suitable with the charge/discharge module.

ECS 101 may be configured to determine the charging and discharging status of the plurality of power packs 118 and batteries 127 or other energy storage units 107 in real-time. For example, in one aspect, ECS 101 may help govern bidirectional charge/discharge in real-time in which the electric charge may flow from the ESU into the plurality of power packs 118 and/or batteries 127 or other energy storage units 107 or vice versa.

The sensors (e.g., thermistor 124) may communicate with ECS 101 to determine if the temperature of the power packs 118 and/or individual components therein show signs of excessive local or system temperature that might lead to harm to the components. In such cases, ECS 101 interacts with the processor 102 and other features (e.g., data stored in the databases of the cloud 114 or database 108 in memory 106 pertaining to safe temperature characteristics for the ESU 107) to cause a change in operation such as decreasing the charging or discharging underway with the portions of the power packs 118 or other units facing excessive temperature. ECS 101 may also regulate cooling systems that are part of the charging and discharging hardware in order to proactively increase cooling of the power packs 118 or batteries 127 or other energy storage units 107, such that increasing the load on them does not lead to harmful temperature increase.

Thus, ECS 101 may also respond to or otherwise act upon forecasts of system demands in the near future for anticipatory control of the ESU 107 for optimized temperature management. ECS 101 may determine that an upcoming episode of high or excessive system demands on a power pack 118 already operating at elevated temperature, and thus make a proactive recommendation to increase cooling on the at-risk power packs 118. Other sensors such as strain gauges, pressure gauges, chemical sensors, etc., may be provided to determine if any of the energy storage units 107 in batteries 127 or other energy storage units 107 or the power packs 118 are facing pressure buildup from outgassing, decomposition, corrosion, electrical shorts, unwanted chemical reactions such as an incipient runaway reaction, or other system difficulties. In such cases, ECS 101 may then initiate precautionary or emergency procedures such as a shut down, electrical isolation of the affected components, warnings to a system administrator via the communication module 140 to the message center, a request for maintenance to a designated maintenance recipient device.

Supercapacitors 120 may be used to improve the power factor delivered with AC when an inductive load is present. For applications employing AC current, a phase difference between current and voltage can occur when there is an inductive load, leading to magnetic reversals and wasted energy. However, power control circuits 117 (power correction circuits) with capacitors can be used to help store and recover some of this wasted energy. This can be important for induction motors, transformers, inductive furnaces, etc.

The power factor is the ratio of active power (or useful power or working power) to total power (apparent power). A power factor less than 0.85 is generally considered poor. With suitable power factor compensation, good power factors of, say 0.95 to 0.98 or 0.95 to 0.99 or higher may be achieved. Working power is often reported in kilowatts (kW), and reactive power is often reported in kilo-volt-amperes-reactive (kVAR). In some aspects, the combinations of supercapacitor power packs to an electric motor with optional harmonic filters may substantially improve the power factor of an electric vehicle or other device. The power control circuits 117 comprising supercapacitors may comprise one or more supercapacitors within the supercapacitor power packs and may be regulated by a chip or other control devices (not shown) which may be operatively associated with a power optimization module of the ESC. The regulating of the power control circuits 117 may comprise turning the power control circuit on or off via switches or other means when needed and/or adjusting the amount of capacitance in the circuit and/or the application of harmonic filters or other tools to achieve an improved power factor, and may comprise measurement of the power factor or related characteristics of power delivery, including apparent power, useful power, impedance, inductive reactance, capacitive reactance, non-linearity of voltage and current, spectral features or other characteristics of electronic noise, etc. In particular, the power optimization module may oversee measurement of power characteristics and measures to improve the power factor, the waveform, etc., for output power and may include active power filtering, harmonic filtering, etc.

A suitable capacitor corrects the power factor by releasing a leading current to compensate the lagging current when there is a phase shift, in effect neutralizing the magnetic current and reducing associated losses. A poor power factor may also be caused by distorted current waveform which may be at least partially corrected through the use of harmonic filters. A set of instructions may be received by the processor 102 and executed for charging and discharging the supercapacitor power packs 118. In one embodiment, the set of instructions may be to facilitate activation of a charging mode and/or a discharging mode to charge and/or discharge the supercapacitor power packs 118.

Further, the communications pathway 145 may facilitate a communication link among the components of the system 100, and may also send and receive information and instructions to third parties or external resources and entities via the network interface 114. Like the communication pathway 145, the network interface 114 may be wired and/or wireless. The network interface 114, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), radio waves, and other communication techniques, known in the art.

The ESU 107 may also comprise supercapacitor power packs 118 positioned on or around a surface of the electric motor. Further, the thermistor 124 or other temperature measurement devices (e.g., thermocouples, IR sensors, etc.) coupled to the electric motor may be configured to monitor a range of temperatures of the supercapacitor power packs 118. The thermistor 124 may be further configured to manage the delta of temperatures. The delta of temperatures refers to temperature differences between various supercapacitor power packs 118 or between various individual supercapacitors 120.

In one embodiment, the ECS 101 may be configured to reduce thermal runaway experienced by the supercapacitor power packs 118 of the electric vehicle in order to prevent harm to the ESU 107 and the vehicle, and to manage the power delivery and charging of the supercapacitor power packs 118 of the electric vehicle. Such thermal control can be achieved by the thermal management module 134 in cooperation with the thermal control hardware 111 of the ESU 107 and/or sensors associated with the other electrical hardware 126. In one embodiment, the electric vehicle may include, but not limited to, a golf cart, a baby cart, an electric car, an electric bike, a recreational vehicle, etc. In one embodiment, the ECS 101 is configured to manage the energy of the battery pack 127 of the electric vehicle.

Further, the ECS 101 may provide smart thermal energy management to the electric motor from the supercapacitor power packs 118 in a controlled manner, in order to maximize the efficiency of charge. Further, the ECS 101 may also provide a real-time thermal charging and/or discharging of the supercapacitor power packs 118 while the electric vehicle may be continuously accelerating and decelerating along a path. In one embodiment, the ESU 107 may be referred as a modular graphene supercapacitor power pack for the electric vehicle whose energy is managed by a combination of the electric motor with the supercapacitor power packs 118 integrated onto the electric motor. In one embodiment, the battery pack 127 may include chemical and nonchemical batteries, such as but not limited to, lithium batteries, lead-acid batteries, supercapacitor batteries, etc.

Power control circuits 117 may be associated with the ESU 107. These may involve circuits using supercapacitors to reduce losses from phase shift with inductive loads that might be encountered, for example, with AC power that might be provided to other loads 121 such as AC appliances in an RV vehicle (inverters or other devices not shown, would be involved in providing AC power). In some versions, the power control circuits 117 may also be used to receive and transform AC power into DC current for charging the supercapacitor power packs 118 and/or the battery pack 127. Also shown a power optimization module 143 which can interact with the power control circuits 117 and other hardware to reduce noise, optimize the current within the system 100 and for external delivery to other loads 121, or to recognize and adapt external power sources used for charging. The power control circuits 117 may cooperate or comprise charging and discharging hardware (not shown) and cooperate with related modules such as the energy management module 130.

Further, ECS 101 may evaluate and enhance the performance of charging and discharging the capacity of the supercapacitor power packs 118. In one embodiment, the performance of the supercapacitor power packs 118 integrated with the electric motor may be enhanced by turning ON/OFF the supercapacitor power packs 118 as per power requirement and also regulate the power of the supercapacitor power packs 118. Further, the plurality of supercapacitors 120 are housed inside the supercapacitor power packs 118 with each supercapacitor 120 having the plurality of electrolytes 122. In one embodiment, each supercapacitor 120 of the plurality of supercapacitors 120 may have a very low thermal delta to historical averages (not shown). In another embodiment, each supercapacitor 120 of the plurality of supercapacitors 120 may have a high thermal delta to historical averages (not shown).

The ECS 101 may further comprise a base module 128 communicatively coupled with the processor 102 and the memory 106 via the connection interface 110. In one embodiment, the base module 128 may be configured to manage parameters related to the supercapacitor power packs 118, such as, but not limited to, electric charge of the supercapacitor power packs 118, and the performance of the supercapacitor power packs 118 when integrated with or used with the electric motor in the electric vehicle. In one embodiment, the base module 128 may act as a central module to receive and send instructions to each of the plurality of modules, as well as control execution of such instructions by the respective modules. In one embodiment, the base module 128 may be configured to activate and/or deactivate a plurality of sub-modules according to the information received from the processor 102 and the memory 106.

Further, the base module 128 may comprise an energy management module 130 configured to receive information related to the charging status of the supercapacitor power packs 118 through the base module 128. Further, the energy management module 130 is configured to determine the charging status of the supercapacitor power packs 118 based on the charge stored in the supercapacitor power packs 118. The operations of energy management module 130 are described in relation to FIG. 4.

Further, the base module 128 may comprise a detector module 132 to detect and monitor thermal events and gradients of the plurality of supercapacitors 120. Further, the detector module 132 may be configured to receive information related to charging or discharging the supercapacitor power packs 118, based on the power capacity of the supercapacitor power packs 118. In one embodiment, the detector module 132 may detect the charge level of each of the supercapacitor power packs 118 and determine the charging rate or discharging rate of the supercapacitor power packs 118. The operations of detector module 132 are described in relation to FIG. 5.

Further, the base module 128 may comprise a thermal management module 134 to extract sensor data related to the monitoring of thermal events and gradients of the plurality of supercapacitors 120. The thermal management module 134 is further configured to turn on or off the plurality of supercapacitors 120 according to the thermal events occurring with each supercapacitor power pack 118. The thermal management module 134 is coupled to an artificial intelligence and machine learning (AI/ML) algorithm and takes into account detection, monitoring, anticipation, and response to change in the temperature and thermal power of the supercapacitor power packs 118 and various charging parameters of the supercapacitor power packs 118. These charging parameters may include current, voltage, inductance, and other power transfer parameters. In one embodiment, the thermal management module 134 may regulate power to each of the plurality of supercapacitors 120. The thermal management module 134 may interact with a plurality of other system functions including a fan, a cooler, or an external controller for regulating the temperature of the system 100. The operations of thermal management module 134 are described in relation to FIG. 6.

Thermal management module 134 may further control fans and other cooling systems. The thermal management module 134 is further configured to manage alerts in other modules. The thermal management module 134 may include or receive data from sensors (e.g., thermistor 124) that monitor thermal events associated with the risk of thermal runaway in the supercapacitor power packs 118. The thermal management module 134 monitors the thermal runaway with taps (e.g., connections of thermistors 124 or other temperature sensors) per pouch or taps per layer to give local information about temperature within a supercapacitor power pack 118. The thermal management module 134 is further configured to monitor the thermal runaway across the plurality of supercapacitors 120 with taps across the supercapacitor power packs 118. In some implementations, the thermal management module 134 may be operated as an external controller module. The operations of thermal management module 134 are described in relation to FIG. 7.

Further, the base module 128 may comprise a controller module 136 to evaluate data related to the speed of the electric motor. The controller module 136 is further configured to detect a change in the speed of the electric motor. The controller module 136 may be coupled to an AI/machine learning system and takes into account detection, monitoring, anticipation and response to change in the speed of the electric motor and various charging parameters of the electric motor. These charging parameters include current, voltage, inductance, and other power transfer parameters.

Further, the base module 128 may comprise a supercapacitor monitoring module 138 to monitor the charge stored in the plurality of supercapacitors 120 of the supercapacitor power packs 118. Further, the base module 128 may be configured to receive information related to the flow of thermal energy from the plurality of supercapacitors 120 of the supercapacitor power packs 118 integrated with the electric motor to the battery pack in real-time. The supercapacitor monitoring module 138 may be also configured to monitor thermal energy losses in the supercapacitor power packs 118 due to excessive charge stored in the plurality of supercapacitors 120. In one embodiment, the supercapacitor monitoring module 138 may also be configured to monitor the thermal efficiency of the supercapacitor power packs 118. The supercapacitor monitoring module 138 may also be configured to monitor temperatures and thermal conductivity of the supercapacitor power packs 118. The supercapacitor monitoring module 138 is described in FIG. 8.

Further, the base module 128 may comprise a communication module 140 communicatively coupled to the energy management module 130, the detector module 132, the thermal management module 134, the controller module 136, and the supercapacitor monitoring module 138. Further, the communication module 140 may be configured to enable receiving information related to temperatures of the supercapacitor power packs 118 in real-time. The communication module 140 may be also configured to enable receiving of data related to the transfer of thermal energy from the supercapacitor power packs 118 to the battery pack, due to excessive charge in the plurality of supercapacitors 120 leading to heating of the plurality of supercapacitors 120. The communication module 140 may also be configured to receive data related to the thermal conductivity of the plurality of supercapacitors 120 of the supercapacitor power packs 118. The communication module 140 may also be configured to receive data related to power stored in the plurality of supercapacitors 120 of the supercapacitor power packs 118. The communication module 140 is described in FIG. 9. In one embodiment, the system 100 may be used for monitoring a graphene supercapacitor power pack to prevent the power pack from exceeding temperature specification (e.g., above 65 C and below −20 C). In another embodiment, the system 100 may be used to activate a heating and/or cooling means to maintain optimal operating temperature of the graphene supercapacitor power pack. In yet another embodiment, the system 100 may be used for managing the temperature regime of a plurality of power sources, wherein the plurality of power sources may be modulated based on their load profile, temperature, and capability.

The communication module 140 can govern communications between the ECS and the outside world, including communications through the cloud, such as making queries and receiving data from various external databases or sending messages to a message center where they may be processed and archived by an administrator, a device owner, the device user, the ESU owner, or automated systems. In some aspects, the communication module 140 may also oversee communication between modules or between the ESU 107 and the ECS 101, and/or work in cooperation with various modules to direct information to and from the display interface 104.

Figure 1B:
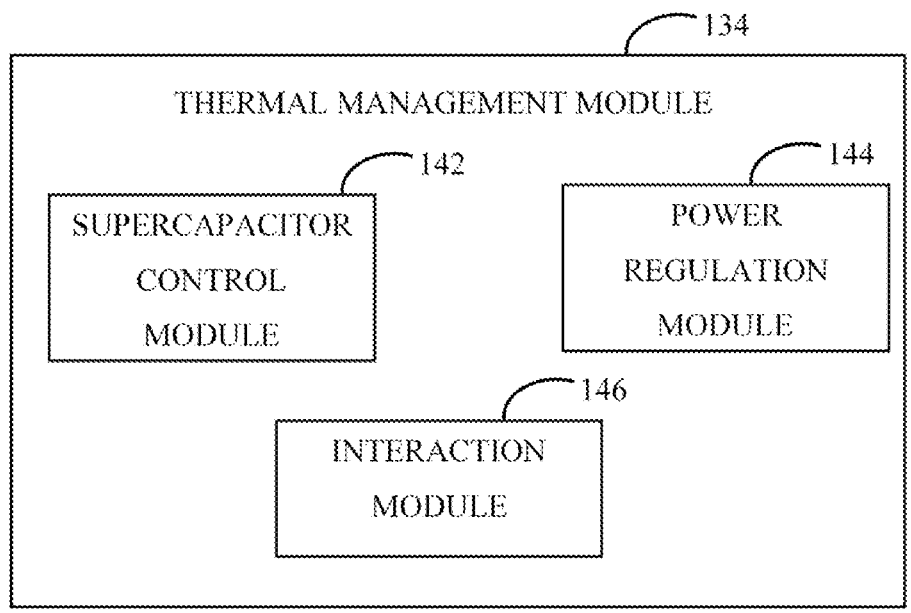
FIG. 1B is a diagram of an exemplary thermal management module used in a system for monitoring and temperature management of power packs.

FIG. 1B is a diagram of an exemplary thermal management module 134 used in a system for monitoring and temperature management of power packs. Thermal management module 134 may include a supercapacitor control module 142, a power regulation module 144, and an interaction module 146. The thermal management module 134 enables the supercapacitor control module 142 to control the power of the plurality of supercapacitors 120 in the supercapacitor power packs 118 by turning ON/OFF the plurality of supercapacitors 120. The thermal management module 134 enables the power regulation module 144 to control power regulation of the plurality of supercapacitors 120 depending on the power available in the plurality of supercapacitors 120 during charging or discharging of the plurality of supercapacitors 120. The thermal management module 134 enables the interaction module 146 to interact with other components such as a fan, a cooler, and other power components of the electric vehicle.

Figure 1C:
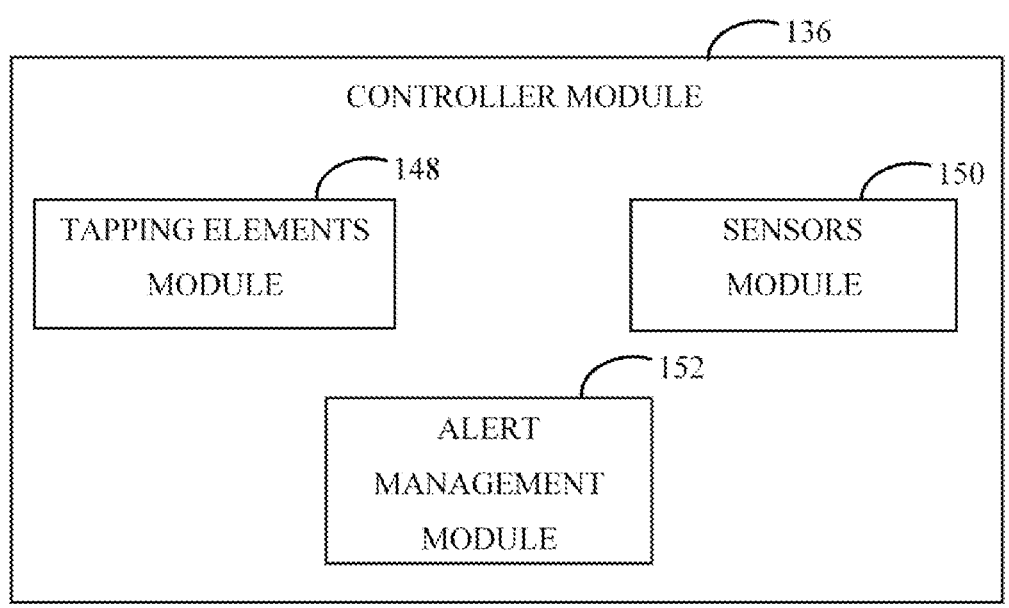
FIG. 1C is a diagram of an exemplary controller module used in a system for monitoring and temperature management of power packs.

FIG. 1C is a diagram of an exemplary controller module 136 used in a system for monitoring and temperature management of power packs. Controller module 136 may include a tapping elements module 148, a sensors module 150, and an alert management module 152. The tapping elements module 148 is configured to monitor thermal runaway in the supercapacitor power packs 118 using tapping elements or taps per pouch or taps per layer. The tapping elements module 148 is configured to enable tapping across the supercapacitor power packs 118 or pouches or layers. The tapping refers to making a point of contact across the supercapacitor power packs 118.

The sensors module 150 is configured to detect and monitor air flow-based readings and convection readings due to the difference in temperatures of the plurality of supercapacitors 120 of the supercapacitor power packs 118. The sensors module 150 is further configured to detect thermal events based on the thermal data meeting specified conditions that define the respective thermal events. The sensors module 150 is further configured to enable tapping utilizing taps across a plurality of supercapacitor power packs 118.

The alert management module 152 is configured to manage alerts related to supercapacitor power packs 118, due to heating of the plurality of supercapacitors 120 as excessive charge gets stored in the plurality of supercapacitors 120. Such alerts may be sent to any one or more of the thermal management module 134, an administrator or other party via the network interface 114, and the display interface 104, particularly when there may be a need to recommend that a vehicle user modify some aspect of the vehicle use to reduce power-related problems. The alert management module 152 is further configured to maintain the temperature of the plurality of supercapacitors 120 of the supercapacitor power packs 118 towards a stable temperature limit and not allowing the temperature of the plurality of supercapacitors 120 to extend beyond a threshold limit as set out as permissible in temperature specifications as recorded in one or more databases pertaining to the supercapacitor power packs 118 such as the charge management database 108. The upper threshold limit of the temperature of the plurality of supercapacitors 120 and the supercapacitor power packs 118 may be 30 degrees Celsius as mentioned in the charge management database 108, or any other suitable temperature such as 40° C., etc.

Figure 2:
FIG. 2 illustrates an exemplary energy management database.

FIG. 2 illustrates an exemplary energy management database 108. As illustrated, the charge management database 108 may be configured to store information related to a variety of supercapacitor power packs 118. In one embodiment, the charge management database 108 stores information of different varieties of power packs 118 such as but not limited to supercapacitor units 120, or other types of chemical and non-chemical power packs 118. Further, the charge management database 108 may be configured to store information related to the thermal power cycle of each of the supercapacitor power packs 118, the maximum and minimum charge for a different type of the supercapacitor power packs 118, thermal power stored in the supercapacitor power packs 118 and state of charge (SoC) profile of each of the supercapacitor power packs 118.

In one embodiment, the charge management database 108 may be configured to store thermal energy data in each of the supercapacitor power packs 118 when connected in series and/or parallel. In another embodiment, the charge management database 108 may also store the thermal energy duration of each of the supercapacitor power packs 118 when integrated with the electric motor. In one example, if the heat flux density of the plurality of supercapacitors 120 is 100 Watts per meter square ($W/m^2$) and the thermal conductivity of the plurality of supercapacitors 120 is 10 Watts per meter Kelvin (W/mK), the power stored in the supercapacitor power packs 118 is 120 W. Corresponding to this, the rise in the temperature or the temperature of the supercapacitor power packs 118 is 12 degrees Celsius from the threshold limit of 30 degrees Celsius. Hence, the thermal efficiency of the supercapacitor power packs 118 is 90 percent.

In another example, if the heat flux density of the plurality of supercapacitors 120 is 90 $W/m^2$ and the thermal conductivity of the plurality of supercapacitors 120 is 9 W/mK, the power stored in the supercapacitor power packs 118 is 110 W. Corresponding to this, the rise in the temperature or the temperature of the supercapacitor power packs 118 is 8 degrees Celsius. Hence, the thermal efficiency of the supercapacitor power packs 118 is 80 percent. In another example, if the heat flux density of the plurality of supercapacitors 120 is 80 $W/m^2$ and the thermal conductivity of the plurality of supercapacitors 120 is 6 W/mK, the power stored in the supercapacitor power packs 118 is 80 W. Corresponding to this, the rise in the temperature or the temperature of the supercapacitor power packs 118 is 6 degrees Celsius. Hence, the thermal efficiency of the supercapacitor power packs 118 is 60 percent. In another example, if the heat flux density of the plurality of supercapacitors 120 is 50 $W/m^2$ and the thermal conductivity of the plurality of supercapacitors 120 is 5 W/mK, the power stored in the supercapacitor power packs 118 is 60 W. Corresponding to this, the rise in the temperature or the temperature of the supercapacitor power packs 118 is 4 degrees Celsius. Hence, the thermal efficiency of the supercapacitor power packs 118 is 45 percent.

In another embodiment, the charge management database 108 may be configured to store the temperature and charging status of the supercapacitor power packs 118 in the electric vehicle. In one example, at the heat flux density of the plurality of supercapacitors 120 to be 100 $W/m^2$ and ten taps (tapping elements), if used in the supercapacitor power packs 118, the thermal conductivity of the plurality of supercapacitors 120 is 90 W/mk. Corresponding to this, the temperature rise is 12 degrees Celsius. Hence, the charging status of the plurality of supercapacitors 120 in the supercapacitor power packs 118 will be at OFF state.

In another example, at the heat flux density of the plurality of supercapacitors 120 to be 90 $W/m^2$ and eight taps, if used in the supercapacitor power, packs 118, the thermal conductivity of the plurality of supercapacitors 120 is 70 W/mk. Corresponding to this, the temperature rise is 8 degrees Celsius. Hence, the charging status of the plurality of supercapacitors 120 in the supercapacitor power packs 118 will be at OFF state. In another example, at the heat flux density of the plurality of supercapacitors 120 to be 80 $W/m^2$ and five taps, if used in the supercapacitor power, packs 118, the thermal conductivity of the plurality of supercapacitors 120 is 55 W/mk. Corresponding to this, the temperature rise is 4 degrees Celsius. Hence, the charging status of the plurality of supercapacitors 120 in the supercapacitor power packs 118 will be at ON state. In another example, at the heat flux density of the plurality of supercapacitors 120 to be 50 $W/m^2$ and only one tap (tapping element) if used in the supercapacitor power packs 118, the thermal conductivity of the plurality of supercapacitors 120 is 15 W/mk. Corresponding to this, the temperature rise is only 2 degrees Celsius. Hence, the charging status of the plurality of supercapacitors 120 in the supercapacitor power packs 118 will be at ON state.

Figure 3A:
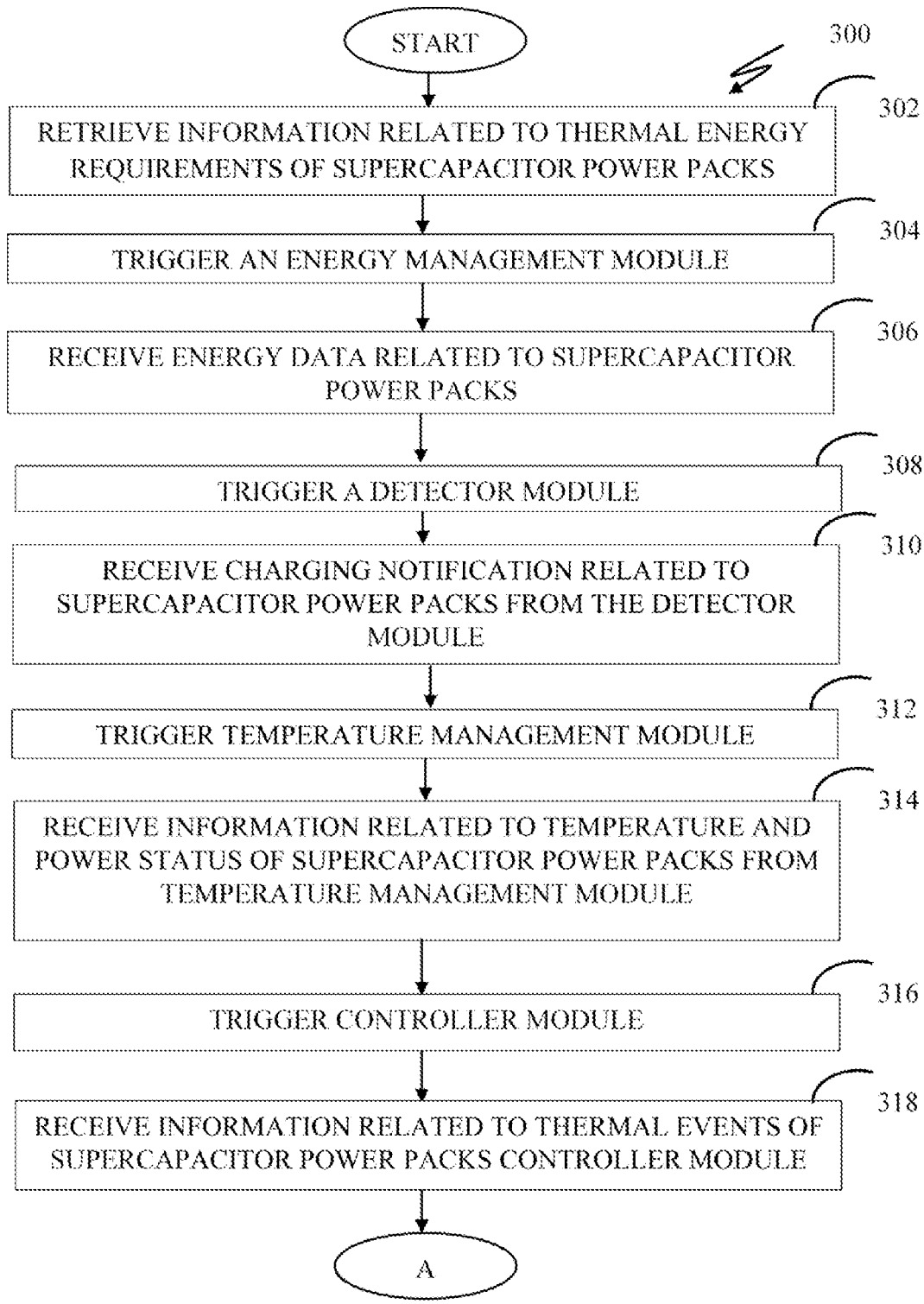
FIGS. 3A-3B combine to provide a flowchart illustrating an exemplary method for monitoring and temperature management of power packs.
Figure 3B:
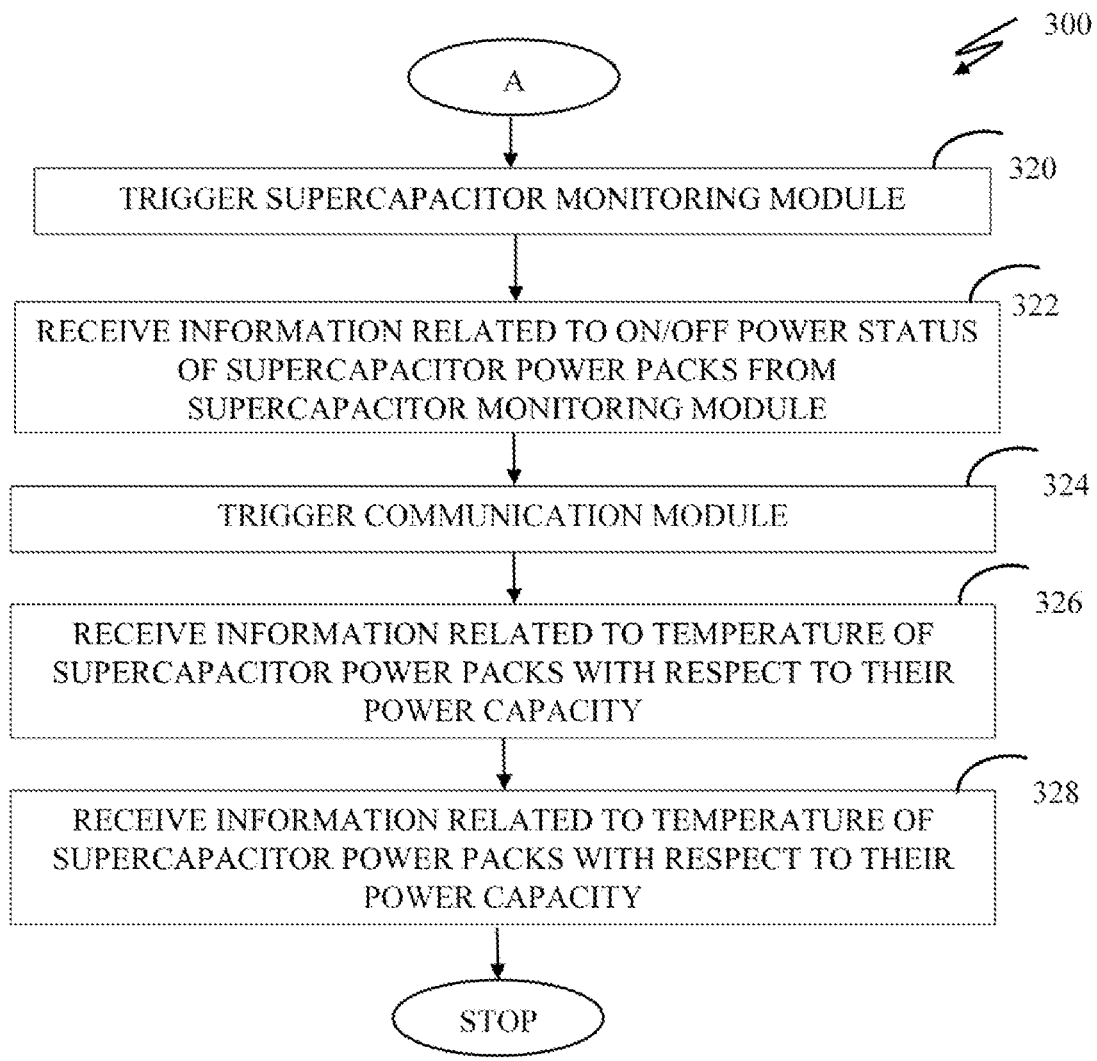

FIGS. 3A-3B combine to provide a flowchart illustrating an exemplary method 300 for monitoring and temperature management of power packs. Method 300 may be performed by executing the base module 128, which may further initiate various other modules and sub-modules described further in relation to FIGS. 4-9. In one embodiment, the base module 128 may be configured to initiate each of the plurality of modules to enhance the performance and the thermal capability of the supercapacitor power packs 118 and the electric motor, both integrated into each other. In some alternative implementations, the functions of the blocks may occur out of the order illustrated in the drawings. For example, two blocks shown in succession in FIGS. 3A-3B may in fact be executed substantially concurrently or the blocks may sometimes be executed in the reverse order, depending upon the functionality involved. In addition, the process descriptions or blocks in flow charts should be understood as representing decisions made by a hardware structure such as a state machine.

In step 302, the base module 128 may be executed to retrieve information related to the thermal energy requirements of the supercapacitor power packs 118 from the charge management database 108. In one embodiment, the information related to the thermal energy requirements may be the thermal conductivity of the plurality of supercapacitors 120, power stored in the supercapacitor power packs 118, and the temperature of the supercapacitor power packs 118. For example, the base module 128 retrieves information from the charge management database 108 that if the heat flux density of 10 supercapacitors connected in series is 100 $W/m^2$ and the thermal conductivity of the 10 supercapacitors is 10 W/mK, the power stored in each supercapacitor power pack 118 is 120 Watts.

Figure 4:
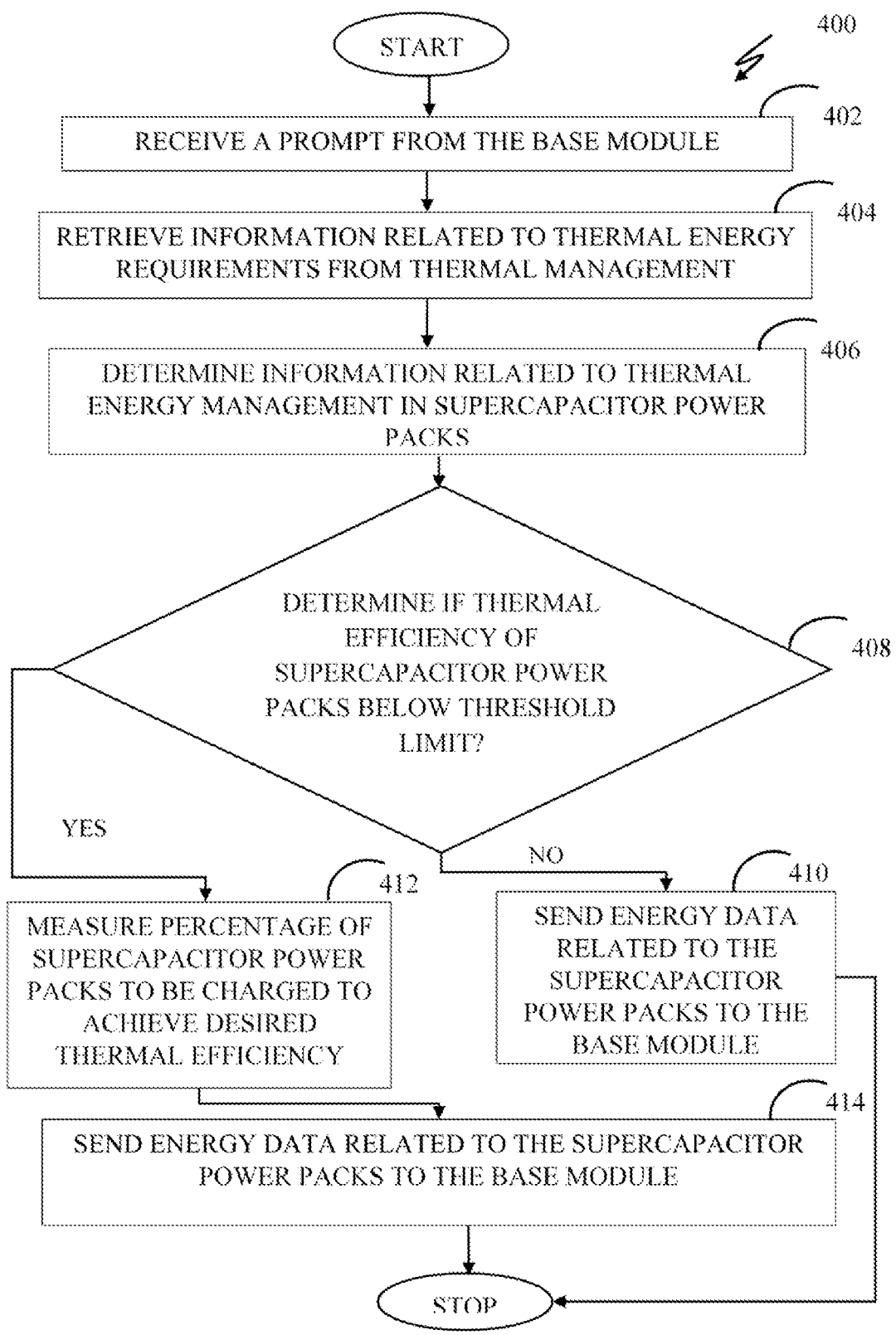
FIG. 4 is a flowchart illustrating an exemplary method for thermal energy monitoring.

In step 304, the base module 128 may trigger execution the energy management module 130, which may result in performance of method 400 (described in further detail in relation to FIG. 4). In step 306, the base module 128 may be configured to receive energy data related to the supercapacitor power packs 118 from energy management module 130. For example, the base module 128 receives the energy data that if the heat flux density of the 10 supercapacitors is 100 $W/m^2$ and the thermal conductivity of the 10 supercapacitors is 10 W/mK, the power stored in each of the 15 supercapacitor units is 120 W.

Figure 5:
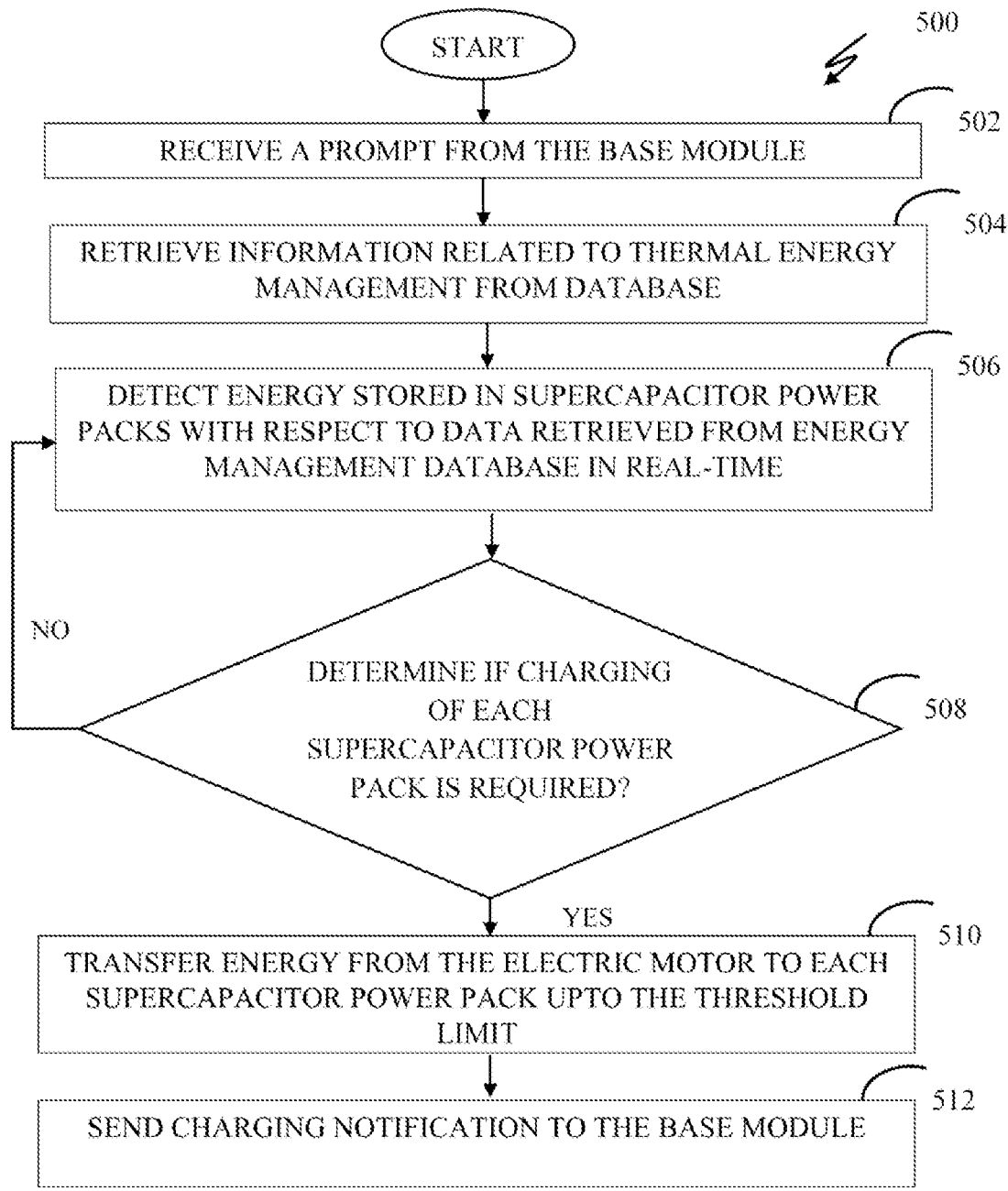
FIG. 5 is a flowchart illustrating an exemplary method for detection of thermal events.

Successively, the base module 128 may be configured to trigger the detector module 132 at step 308, which may result in performance of method 500 (described in further detail in relation to FIG. 5). In step 310, the base module 128 may be configured to receive the charging notification related to the supercapacitor power packs 118 from the detector module 132. For example, the base module 128 receives the charging notification that out of the 10 supercapacitor units 3 have been charged to the threshold limit of 90 percent, 4 supercapacitor units are charged to 90 percent from 60 percent.

Successively, the base module 128 may be configured to trigger the thermal management module 134 at step 312. In one embodiment, the base module 128 may trigger the thermal management module 134 to determine thermal events of the supercapacitor power packs 118 during charging and/or discharging, which may include method 600 (described in further detail in relation to FIG. 6). Further, the base module 128 may be configured to receive the information related to temperature and charging status of supercapacitor power packs 118 from the thermal management module 134 at step 314. For example, the base module 128 receives that the 10 supercapacitor units are having a temperature of 12 degrees Celsius above the threshold limit of 30 degrees Celsius and the charging status of the 10 supercapacitor units is turned OFF.

Successively, the base module 128 may be configured to trigger the controller module 136 at step 316. In one embodiment, the base module 128 may trigger the controller module 136 to determine data related to the thermal events monitoring and management, which may include performance of method 700 (described in further detail in relation to FIG. 7). Further, the base module 128 may be configured to receive the information related to thermal events of the supercapacitor power packs 118 from the controller module 136 at step 318. For example, the base module 128 receives the information that the thermal energy loss of the 10 supercapacitor units is 8 J/C which is 6 J/C above the threshold limit of 2 J/C and the charging capacity of the 10 supercapacitor units is discharged to 40-50 percent of their capacity. The controller module 136 may be further configured to provide enablement of different operative mode controls of the electric motor based on the speed of the electric motor and the power capacity of the electric motor. The different operative mode controls are regenerative braking, dynamic braking, and plugging.

Figure 8:
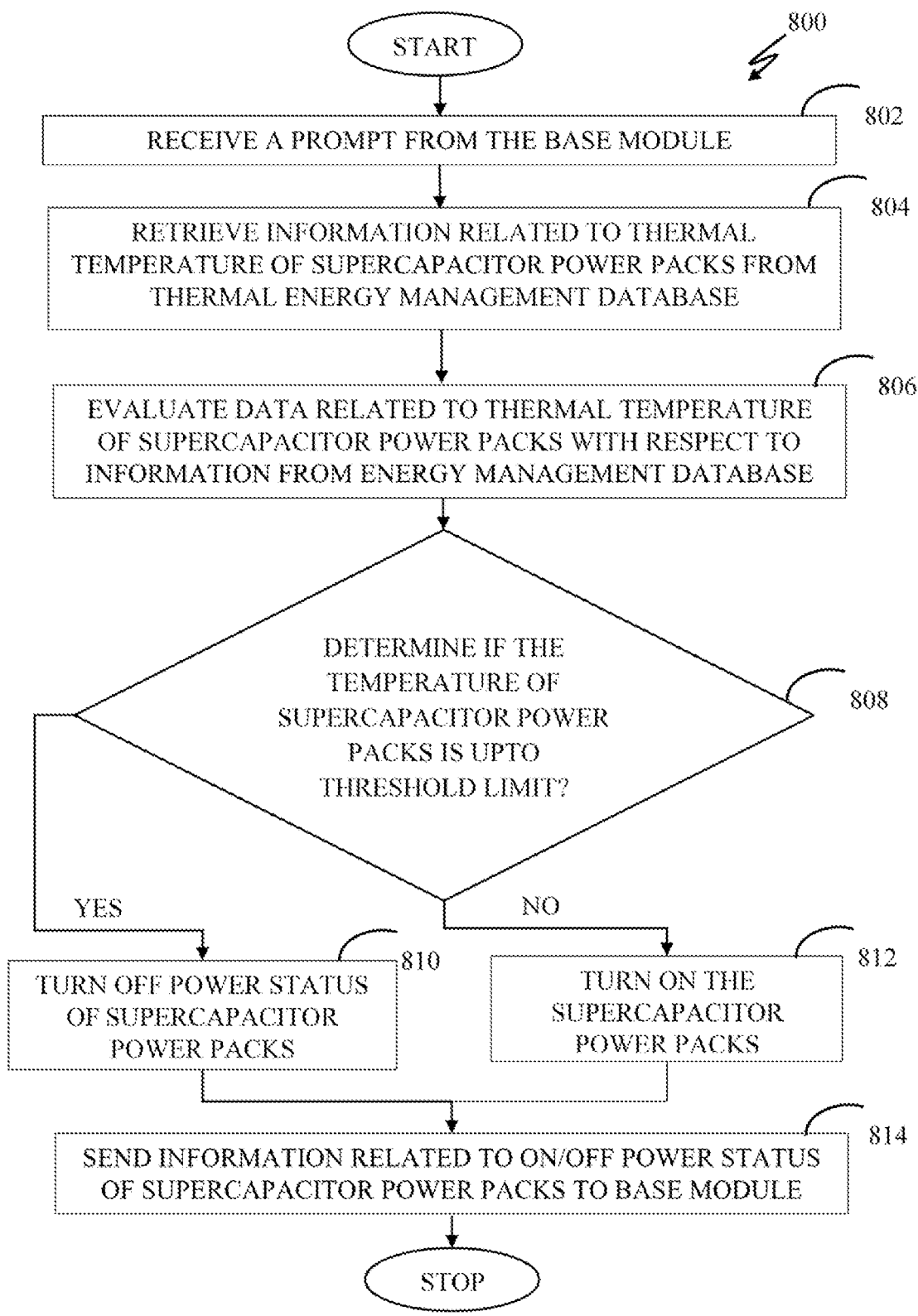
FIG. 8 is a flowchart illustrating an exemplary method for supercapacitor monitoring.

In step 320, the base module 128 may be configured to trigger the supercapacitor monitoring module 138, which may include performance of method 800 (described in further detail in relation to FIG. 8). Successively, the base module 128 may be configured to receive information related to ON/OFF charging status of the supercapacitor power packs 118 from the supercapacitor monitoring module 138 at step 322. For example, the base module 128 receives information that the charging status of the 10 supercapacitor units with power capacity of 60 W is turned ON when the temperature is 2 degrees Celsius below the threshold limit of 30 degrees Celsius and the charging status of the 10 supercapacitor units with power capacity of 110 W is turned OFF when the temperature is 8 degrees Celsius above the threshold limit of 30 degrees Celsius.

Figure 9:
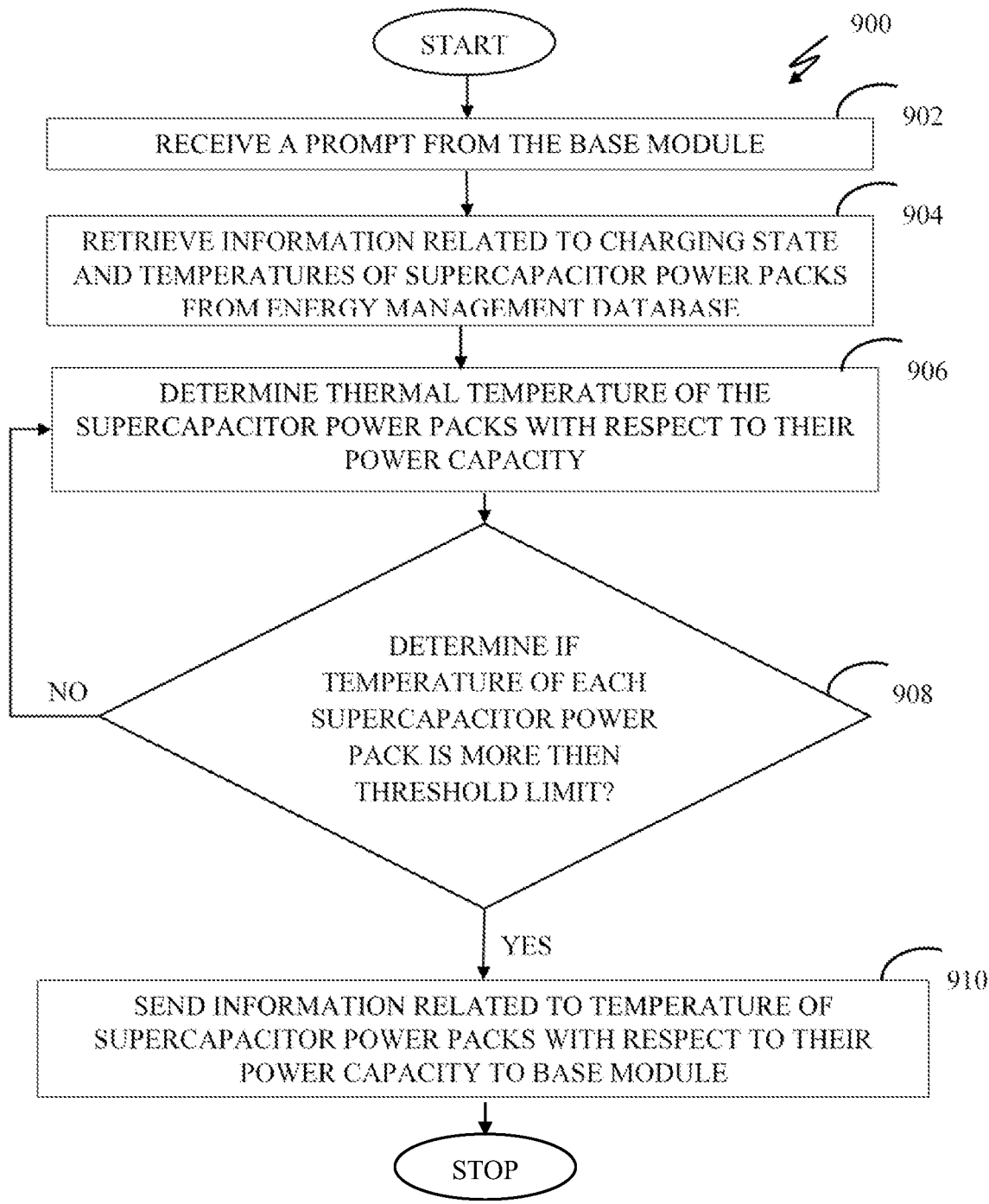
FIG. 9 is a flowchart illustrating an exemplary method for thermal event-based communications.

In step 324, base module 128 may be configured to trigger the communication module 140, which may include performance of method 900 (described in further detail in relation to FIG. 9). The base module 128 may be configured to receive information related to the temperature of supercapacitor power packs 118 with respect to their power capacity from the communication module 140, at step 326. For example, the base module 128 receives information that the temperature of the 10 supercapacitor units is 12 degrees Celsius above the threshold limit of 30 degrees Celsius, provided the power capacity of the 10 supercapacitor units is 120 W. Successively, the base module 128 may be configured to send the information related to the temperature of supercapacitor power packs 118 with respect to their power capacity to the display interface 104 at step 328. For example, the base module 128 sends information that the temperature of the 10 supercapacitor units is 12 degrees Celsius above the threshold limit of 30 degrees Celsius, provided the power capacity of the 10 supercapacitor units is 120 W.

FIG. 4 is a flowchart illustrating an exemplary method 400 for thermal energy monitoring. As noted above, method 400 may be performed based on execution of energy management module 130 by processor 102 in response to trigger by base module 128 (at step 304 of method 300).

Method 400 may begin with the energy management module 130 receiving a prompt from the base module 128 at step 402. In one embodiment, the energy management module 130 may be configured to identify the type of the supercapacitor power pack, the charge stored in the supercapacitor power packs 118, and the temperature of each of the supercapacitor power packs 118.

In step 404, the energy management module 130 may be configured to retrieve information related to the thermal energy requirements from the charge management database 108. For example, the energy management module 130 retrieves information from the charge management database 108 that the temperature of 15 supercapacitor units is 12 degrees Celsius more than the threshold limit of 30 degrees Celsius, corresponding to the thermal conductivity of 90 W/mK of the 10 supercapacitors. Each of the 15 supercapacitor units may include 10 supercapacitors connected in series and/or parallel.

In step 406, the energy management module 130 may successively determine the information related to thermal energy management in supercapacitor power packs 118. For example, the energy management module 130 determines that when the heat flux density of the 10 supercapacitors is 90 $W/m^2$ with eight taps being used in the 15 supercapacitor units, then the thermal conductivity of the 10 supercapacitors is 70 W/mK.

In step 408, the energy management module 130 may be configured to determine, if the thermal efficiency of the supercapacitor power packs 118 is below the threshold limit. In one embodiment, the energy management module 130 may determine whether the supercapacitor power packs 118 may have thermal efficiency below the threshold limit. In one embodiment, the threshold limit for thermal efficiency of the supercapacitor power packs 118 may be 90 percent.

In one case, the energy management module 130 determines when the thermal efficiency of the supercapacitor power packs 118 is equal to or above the threshold limit, then the energy management module 130 may proceed further to step 410, which includes sending energy data related to the supercapacitor power packs 118 to the base module 128. The energy data related to the supercapacitor power packs 118 may include, the available charge on the supercapacitor power packs 118, amount of charge required to energize the supercapacitor power packs 118. For example, the energy management module 130 determines that at the thermal conductivity of 5 W/mK of the 10 supercapacitors, the power stored in the 15 supercapacitor units is 120 W and then the thermal efficiency of the 15 supercapacitor units is 90 percent.

In another case, the energy management module 130 determines that when the thermal efficiency of the supercapacitor power packs 118 is below the threshold limit, the energy management module 130 may proceed further to step 412, which includes measuring the percentage of supercapacitor power packs 118 to be charged to achieve a desired thermal efficiency. For example, the energy management module 130 determines that out of 15 supercapacitor units, 5 supercapacitor units that are charged up to 60 percent of the capacity need to be charged up to the threshold limit of 90 percent. Further, the energy management module 130 may be configured to measure the percentage of supercapacitor power packs 118 to be charged to achieve the desired thermal efficiency at step 412. For example, the energy management module 130 measures out of 15 supercapacitor units, 5 supercapacitor units are charged below 60 percent and need to be charged up to the threshold limit of 90 percent of their capacity to achieve the desired thermal efficiency of 90 percent.

Successively, the energy management module 130 may be configured to send energy data related to the supercapacitor power packs 118 to the base module 128 at step 414. For example, the energy management module 130 sends to the base module 128 that out of 15 supercapacitor units, 5 supercapacitor units need to be charged up to the threshold limit of 90 percent. As noted above, method 400 may be triggered by base module 128 at step 304 of method 300. When method 400 is complete, the base module may resume performance of method 300 at step 306.

FIG. 5 is a flowchart illustrating an exemplary method for detection of thermal events. As noted above, method 500 may be performed based on execution of detector module 132 by processor 102 in response to trigger by base module 128 (at step 308 of method 300).

In step 502, the detector module 132 may receive a prompt from the base module 128. The detector module 132 may be configured to detect the charge of each of the supercapacitor power packs 118. In one embodiment, the supercapacitor power packs 118 may be supercapacitor units and the threshold limit of each supercapacitor unit may be 90 percent of its capacity. In one embodiment, the detector module 132 may be activated and deactivated automatically by the base module 128 upon receiving information related to the thermal energy management of the supercapacitor power packs 118 through the energy management module 130.

In step 504, the detector module 132 may be configured to retrieve information related to the thermal energy management of the supercapacitor power packs 118 from the charge management database 108. In one embodiment, the detector module 132 may be configured to retrieve the charging requirement of the supercapacitor power packs 118, from the charge management database 108. For example, the detector module 132 might retrieve the charging requirement that 10 supercapacitor units connected in series need to be charged up to the threshold limit of 90 percent of their thermal capacity.

In step 506, the detector module 132 may be configured to detect energy stored in the supercapacitor power packs 118 retrieved from the charge management database 108 in real-time. In one embodiment, the energy stored may be in the form of an electric charge with respect to the data related to the energy of the supercapacitor power packs 118. In one embodiment, the detector module 132 may also detect the amount of charge left within the supercapacitor power packs 118 when connected with the electric motor. In one embodiment, the detector module 132 measures the amount of energy stored on each of the supercapacitor power packs 118. For example, the detector module 132 detects that the amount of the electric charge of the 10 supercapacitor units, for instance, the power stored on the 10 supercapacitor units is 120 watts corresponding to the thermal conductivity of 10 W/mK of the 10 supercapacitor units.

Successively, in step 508, the detector module 132 may determine if charging of each of the supercapacitor power packs 118 is required. In one case, the detector module 132 may determine that no charging of each of the supercapacitor power packs 118 is required, then the detector module 132 may be redirected back to step 506 to detect the energy stored in the supercapacitor power packs 118 with respect to the data retrieved from the charge management database 108 in real-time. For example, the detector module 132 determines that out of 10 supercapacitor units, each supercapacitor unit is charged equal to the threshold limit of 90 percent with the power capacity of 120 W.

In another case, if the detector module 132 determines that charging of the supercapacitor power packs 118 is required, then the detector module 132 may enable the energy management module 130 to transfer the energy from the electric motor to each supercapacitor power pack 118 up to the threshold limit at step 510. For example, the electric motor has a flywheel that can be used for regenerative energy transfer from the electric motor to charge batteries (not shown). Another embodiment may has a breaking system that can be used for regenerative energy transfer from the electric motor to charge batteries (not shown). For example, the detector module 132 determines that if each of the 10 supercapacitor units is almost completely drained to 10 percent of their capacity, then the detector module 132 proceeds to transfer energy from the electric motor to each supercapacitor units up to the threshold limit at step 510. In one embodiment, the threshold limit of the supercapacitor power packs 118 may vary according to the desired usage of the supercapacitor power packs 118. In one exemplary embodiment, the threshold limit of each of 10 supercapacitor units may be up to 90 percent of their thermal efficiency to hold the power of 120 W for series or parallel connection. For example, the detector module 132 charges the 3 supercapacitor units which are at 0 percent of their capacity to 90 percent of their capacity by transferring energy from the electric motor to the 3 supercapacitor units power capacity of 120 W.

Successively, the detector module 132 may be configured to send a charging notification to the base module 128 at step 512. For example, the detector module 132 sends the charging notification that out of the 10 supercapacitor units 3 have been charged to the threshold limit of 90 percent, 4 supercapacitor units are charged to 90 percent from 60 percent and the rest of 3 supercapacitor units are not charged. As noted above, method 500 may be triggered by base module 128 at step 308 of method 300. When method 400 is complete, the base module may resume performance of method 300 at step 310.

Figure 6:
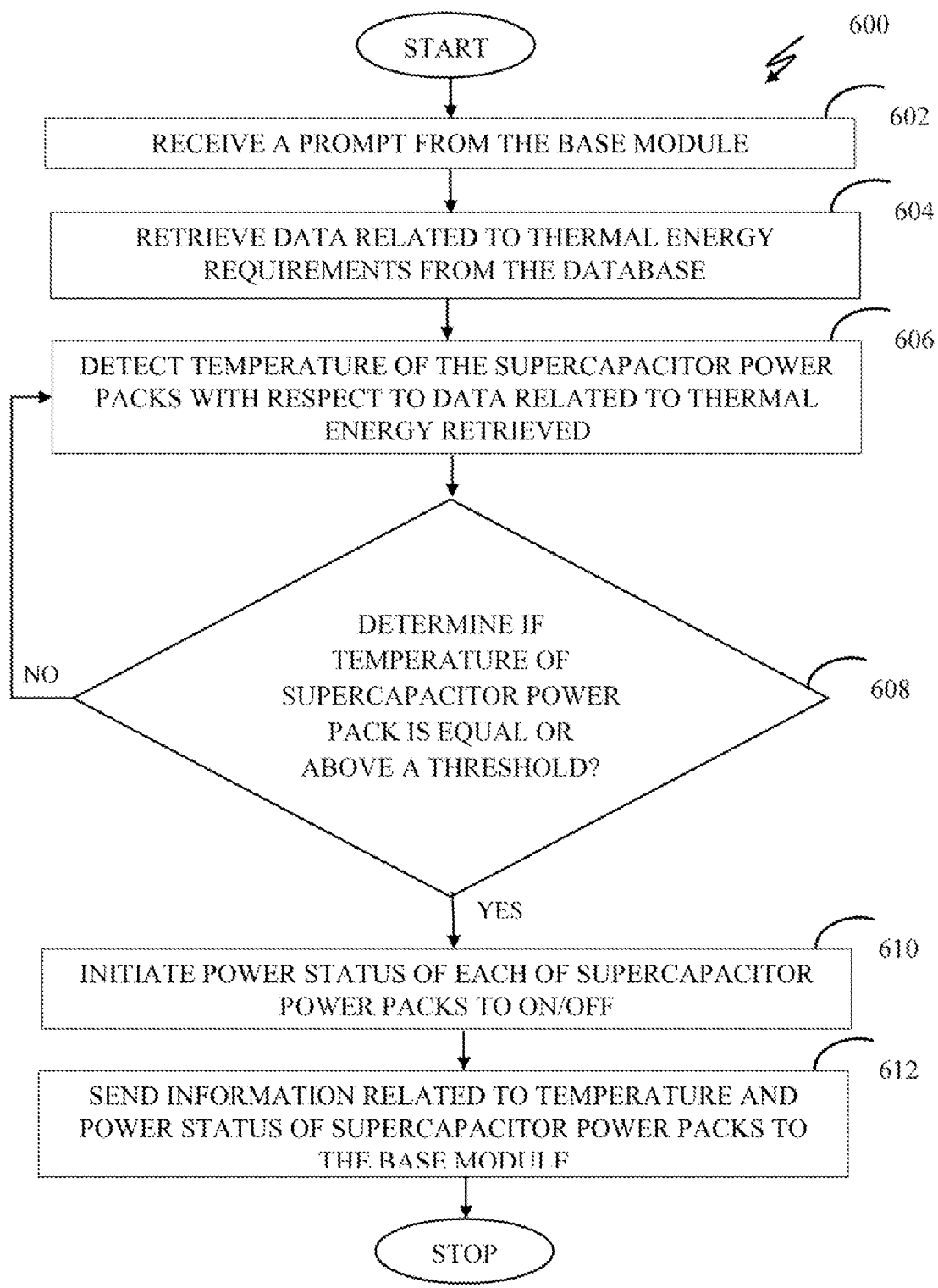
FIG. 6 is a flowchart illustrating an exemplary method for thermal management.

FIG. 6 is a flowchart illustrating an exemplary method for thermal management. As noted above, method 600 may be performed based on execution of thermal management module 134 by processor 102 in response to trigger by base module 128 (at step 312 of method 300).

In step 602, the thermal management module 134 may receive a prompt from the base module 128. The thermal management module 134 may be configured to monitor and control the temperature of the supercapacitor power packs 118 up to the threshold limit. In one embodiment, the supercapacitor power packs 118 may be supercapacitor units or batteries and the threshold limit of each supercapacitor unit may be 90 percent of its capacity. In one embodiment, the thermal management module 134 may be activated and deactivated automatically by the base module 128 upon receiving the request from the energy management module 130 related to the temperature control of the supercapacitor power packs 118 based on the data related to the thermal events with charging and discharging of the supercapacitor power packs 118 obtained through the charge management database 108.

In step 604, the thermal management module 134 may be configured to retrieve data related to the thermal energy requirements from the charge management database 108. In one embodiment, the thermal management module 134 may be configured to retrieve data about thermal events, such as temperature, of the supercapacitor power packs 118 to be used or consumed by the electric vehicle, from the charge management database 108. For example, the thermal management module 134 might retrieve information that the 10 supercapacitor units connected in series with the power capacity of 120 W have a temperature rise of 12 degrees Celsius from the threshold limit of 30 degrees Celsius.

In step 606, the thermal management module 134 may be configured to detect the temperature of each of the supercapacitor power packs 118 with respect to data related to thermal energy requirements retrieved from the charge management database 108 in real-time. In one embodiment, the thermal management module 134 may also detect the amount of temperature rise from each of the supercapacitor power packs 118 when connected to the electric motor. In one embodiment, the thermal management module 134 detects the amount of charge left on each of the supercapacitor power packs 118 corresponding to the temperature of the supercapacitor power packs 118. For example, the thermal management module 134, detects that out of 10 supercapacitor units, 5 supercapacitor units are at a temperature rise of 8 degrees Celsius from the threshold limit of 30 degrees Celsius, and the remaining 5 supercapacitor units are at the rise of 12 degrees Celsius from the threshold temperature of 30 degrees Celsius.

In step 608, the thermal management module 134 may determine if the temperature of each of the supercapacitor power packs 118 is above the threshold temperature limit. For example, the thermal management module 134 determines that out of 10 supercapacitor units, 5 supercapacitor units are at the temperature rise of 8 degrees Celsius, and the remaining 5 supercapacitor units are at the temperature rise of 12 degrees Celsius, from the threshold temperature of 30 degrees Celsius.

In one case, the thermal management module 134 may determine that each of the supercapacitor power pack 118 is having a temperature below the threshold temperature. For example, out of 10 supercapacitor units, each unit is having a temperature of 2 degrees Celsius below the threshold limit of 30 degrees Celsius. In this case, the thermal management module 134 is redirected back to step 606 to again detect the temperature of each of the supercapacitor power packs 118.

In another case, the thermal management module 134 may determine that each supercapacitor power pack 118 is having a temperature equal to or above the threshold limit. For example, each of the 10 supercapacitor units is having a temperature of 12 degrees Celsius above the threshold limit of 30 degrees Celsius. In this case, the thermal management module 134 may proceed to step 610 to initiate the charging status of each of the supercapacitor power packs 118 to OFF.

In step 612, the thermal management module 134 may be configured to send information related to temperature and charging status of supercapacitor power packs 118 to the base module 128. For example, the thermal management module 134 is configured to send the information that 10 supercapacitor units are having a temperature of 12 degrees Celsius above the threshold limit of 30 degrees Celsius and the charging status of the 10 supercapacitor units is turned OFF. As noted above, method 600 may be triggered by base module 128 at step 312 of method 300. When method 600 is complete, the base module may resume performance of method 300 at step 314.

Figure 7:
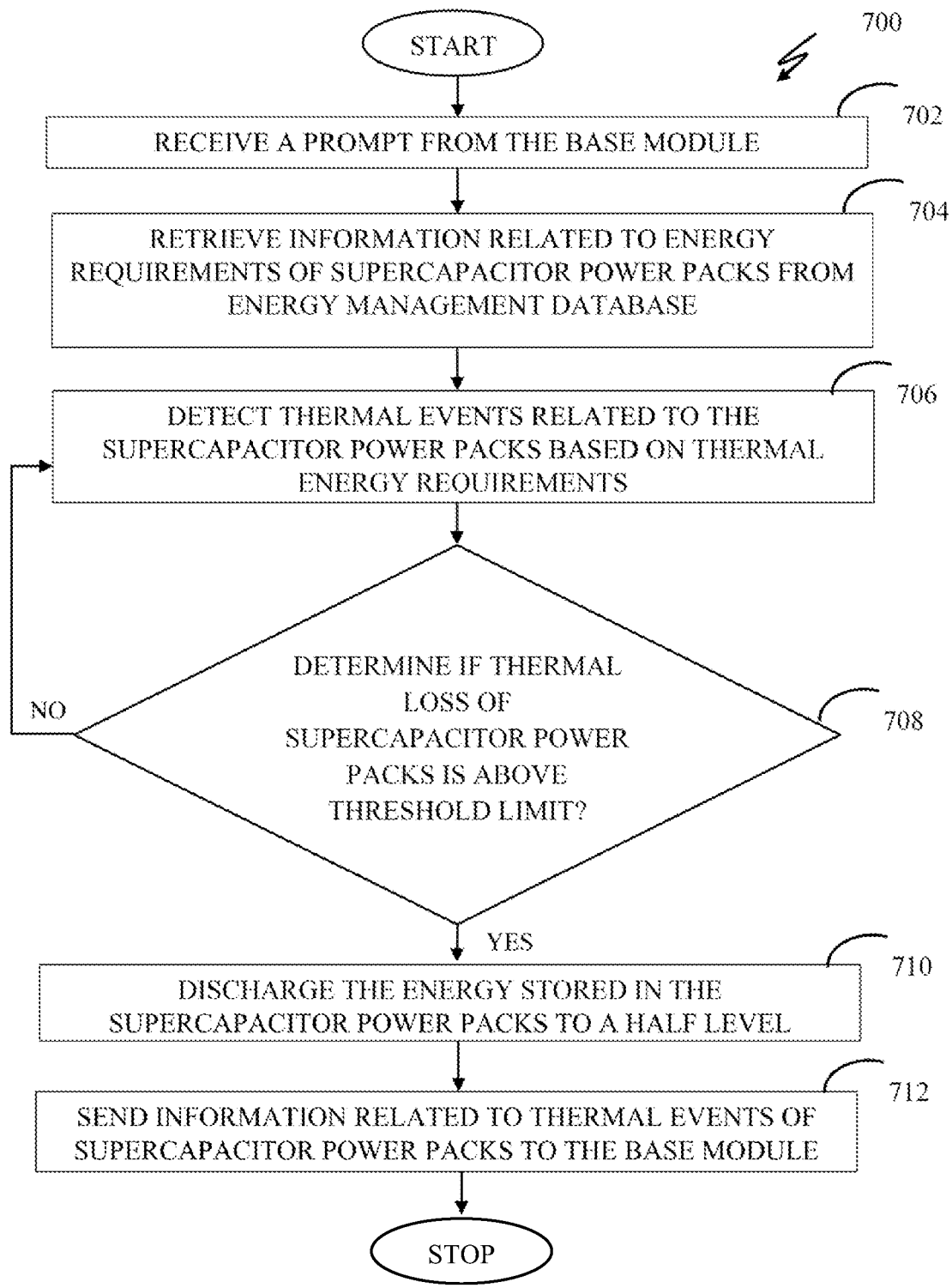
FIG. 7 is a flowchart illustrating an exemplary method for controller management of thermal events.

FIG. 7 is a flowchart illustrating an exemplary method 700 for controller management of thermal events. As noted above, method 700 may be performed based on execution of controller module 136 by processor 102 in response to trigger by base module 128 (at step 316 of method 300).

In step 702, the controller module 136 may be receive a prompt from the base module 128. The controller module 136 may be configured to charge the supercapacitor power packs 118 up to the threshold limit and to retrieve information related to the thermal energy requirements from the charge management database 108 at step 704. In one embodiment, the controller module 136 may be activated and deactivated automatically by the base module 128 upon receiving the request from the energy management module 130 related to the thermal events. In one embodiment, the controller module 136 may be configured to retrieve and control the charging requirement of the supercapacitor power packs 118 to be used or consumed by the electric vehicle, from the charge management database 108. For example, the controller module 136 retrieves the charging requirements that 10 supercapacitor units need to be charged equal to more than 90 percent of their capacity by maintaining the temperature equal to or below the threshold limit of 30 degrees Celsius.

Further, controller module 136 may be configured to detect thermal events related to the supercapacitor power packs 118 based on the thermal energy requirements in real-time at step 706. The thermal events refer to the thermal runaway of the supercapacitor power packs 118 in which the heat generated in the plurality of supercapacitors 120 exceeds the amount of heat that is generated within the surroundings. In one embodiment, the controller module 136 may also detect the amount of charge left in each of the supercapacitor power packs 118 when connected with the processor 102. For example, the controller module 136 detects that the thermal energy losses in the 10 supercapacitor units are 12 Joules/Coulomb. Successively, the controller module 136 may determine if thermal energy loss of the plurality of supercapacitors 120 in the supercapacitor power packs 118 is above the threshold limit at step 708.

In one case, controller module 136 may determine that the thermal energy loss of the supercapacitor power packs 118 is below the threshold limit. The threshold limit of the thermal loss may vary according to the number of supercapacitor power packs 118 installed with the electric motor. In one embodiment, the threshold limit is 2 J/C for each supercapacitor power pack 118. For example, the controller module 136 determines that the 10 supercapacitor units have the thermal loss of 2 J/C which is equal to the threshold limit of thermal energy loss. In this case, the controller module 136 is directed back to step 706 to again detect thermal events related to supercapacitor power packs 118. In another case, the controller module 136 may determine that the supercapacitor power packs 118 have thermal energy loss above the threshold limit. For example, the controller module 136 determines that when the 10 supercapacitor units are charged above 80 percent, then the thermal loss of the 10 supercapacitor units is 8 J/C which is 6 J/C above the threshold limit of 2 J/C. In this case, the controller module 136 is configured to proceed to step 710 to discharge the energy stored in the supercapacitor power packs 118 to half level. For example, the controller module 136 discharges the charging capacity of the 10 supercapacitor units between 40-50 percent of their capacity.

Successively, the controller module 136 may be configured to send information related to thermal events of the supercapacitor power packs 118 to the base module 128, at step 712. For example, the controller module 136 is configured to send the information that the thermal loss of the 10 supercapacitor units is 8 J/C which is 6 J/C above the threshold limit of 2 J/C and the charging capacity of the 10 supercapacitor units is discharged to 40-50 percent of their capacity. As noted above, method 700 may be performed based on execution of controller module 136 by processor 102 in response to trigger by base module 128 (at step 316 of method 300).

FIG. 8 is a flowchart illustrating an exemplary method 800 for supercapacitor monitoring. As noted above, method 800 may be performed based on execution of supercapacitor monitoring module 138 by processor 102 in response to trigger by base module 128 (at step 320 of method 300).

In step 802, the supercapacitor monitoring module 138 may be configured to receive a prompt from the base module. The supercapacitor monitoring module 138 may be configured to monitor and determine the amount of charge required from each of the supercapacitor power packs 118.

In step 804, the supercapacitor monitoring module 138 may be configured to retrieve information related to the temperatures of the supercapacitor power packs 118 from the charge management database 108. In one embodiment, the supercapacitor monitoring module 138 may be configured to retrieve information related to charge corresponding to the temperatures of the supercapacitor power packs 118 from the charge management database 108. For example, the supercapacitor monitoring module 138 retrieves information that the charging capacity of each of the 10 supercapacitor units is 90 percent of their capacity and the temperature of each of the supercapacitor units is 12 degrees Celsius more than the threshold limit of 30 degrees Celsius.

In step 806, the supercapacitor monitoring module 138 may be configured to evaluate data related to temperatures of the supercapacitor power packs 118 with respect to the information related to temperatures of the supercapacitor power packs 118 obtained through the charge management database 108. For example, the supercapacitor monitoring module 138 evaluates that 10 supercapacitor units are charged up to 90 percent of their thermal capacity with the power capacity of 120 W corresponding to the temperature of 12 degrees Celsius more than the threshold temperature of 30 degrees Celsius.

In step 808, the supercapacitor monitoring module 138 may determine, if the temperature of the supercapacitor power packs 118 is up to the threshold limit. In one embodiment, the supercapacitor monitoring module 138 may be configured to determine whether each of the plurality of supercapacitor power packs 118 may be charged above the threshold limit based on the temperature of the supercapacitor power packs 118.

In one case, the supercapacitor monitoring module 138 may determine if the temperature of the supercapacitor power packs 118 is above the threshold limit, then the method may proceed to step 810, at which the charging status of the supercapacitor power packs 118 are turned "OFF" (in OFF state). For example, the supercapacitor monitoring module 138 determines that if the temperature of the 10 supercapacitor units is 12 degrees Celsius above the threshold limit of 30 degrees Celsius with power capacity being 120 W, then the supercapacitor monitoring module 138 proceeds to step 810, to turn OFF the charging status to the supercapacitor units.

In another case, the supercapacitor monitoring module 138 may determine that if each of the supercapacitor power packs 118 are charged below the threshold limit, then the supercapacitor monitoring module 138 may proceed to step 812 to turn OFF the charging status to of the supercapacitor power packs 118. For example, the supercapacitor monitoring module 138 determines that the temperature of the 10 supercapacitor units is only 2 degrees Celsius below the threshold limit of 30 degrees Celsius with the power capacity of 60 W, then the supercapacitor monitoring module 138 proceeds to step 812 to turn ON the charging status of the 10 supercapacitor units.

In step 814, the supercapacitor monitoring module 138 may be configured to send the information related to ON/OFF charging status of the supercapacitor power packs 118 to the base module 128. For example, the supercapacitor monitoring module 138 sends the information that the charging status of the 10 supercapacitor units is turned ON when the temperature is 2 degrees Celsius below the threshold limit of 30 degrees Celsius and is turned OFF when the temperature is 2 degrees Celsius above the threshold limit of 30 degrees Celsius. As noted above, method 800 may be triggered by base module 128 at step 320 of method 300. When method 800 is complete, the base module may resume performance of method 300 at step 322.

FIG. 9 is a flowchart illustrating an exemplary method 900 for thermal event-based communications. As noted above, method 900 may be performed based on execution of communication module 140 by processor 102 in response to trigger by base module 128 (at step 322 of method 300).

In step 902, the communication module 140 may be configured to receive a prompt from the base module 128. The communication module 140 may be configured to detect the temperature and charging capacity of the supercapacitor power packs 118 to a specific charging status of ON/OFF to meet the desired charge cycle. In one exemplary embodiment, the desired charge cycle of each of the supercapacitor power packs 118 is 2 hours when each supercapacitor power pack is charged up to the threshold limit of 90 percent and the charging status of the supercapacitor power pack is turned OFF, corresponding to 90 percent of thermal capacity. In one embodiment, the communication module 140 may be configured to be activated and/or deactivated by the base module 128 according to the information received from the supercapacitor monitoring module 138 to charge and/or discharge the supercapacitor power packs 118 respectively.

In step 904, the communication module 140 may be configured to retrieve information related to the charging state and the temperatures of the supercapacitor power packs 118 from the charge management database 108. In one embodiment, the communication module 140 may retrieve information that temperatures of each of the supercapacitor power pack 118, corresponding to the power capacity of the supercapacitor power packs 118. For example, the communication module 140 retrieves information that the 10 supercapacitor units are charged nearly 80 percent of their capacity, which is below the threshold limit of 90 percent, and the power capacity of the 10 supercapacitor units is 110 W at temperatures 8 degrees Celsius above the threshold temperature limit of 30 degrees Celsius.

In step 906, the communication module 140 may be configured to determine the temperature of the supercapacitor power packs 118 with respect to their power capacity. For example, communication module 140 determines that out of the 10 supercapacitor units 5 are having a temperature of 6 degrees Celsius above the threshold limit of 30 degrees Celsius with a power capacity of 80 W, and the rest of 5 supercapacitor units have a temperature of 2 degrees Celsius above the threshold limit of 30 degrees Celsius with a power capacity of 60 W.

In step 908, the communication module 140 may determine if the temperature of each of the supercapacitor power pack 118 is more than the threshold limit. In one embodiment, the communication module 140 may determine whether the temperature of each of the supercapacitor power packs 118 is more than the threshold limit during charging to deliver the desired or specific charge cycle. In one case, the communication module 140 may determine that if the supercapacitor power packs 118 are having a temperature below the threshold limit to deliver the desired charge cycle from each supercapacitor power pack 118. For example, the communication module 140 determines that the temperature of each of the 10 supercapacitor units with a power capacity of 60 W, is 2 degrees Celsius below the threshold temperature of 30 degrees Celsius. In this case, the communication module 140 is redirected back to step 906, to again determine the temperature of each of the supercapacitor power packs 118 with respect to their power capacity. In another case, the communication module 140 may determine that if the temperature of the supercapacitor power packs 118 is above the threshold limit to deliver the desired charge cycle. For example, the communication module 140 determines that the temperature of the 10 supercapacitor units with a power capacity of 120 W, is 12 degrees Celsius above the threshold limit of 30 degrees Celsius. In this case, the communication module 140 proceeds to step 910 to send information related to the temperature of the supercapacitor power packs 118 with respect to their power capacity to the base module 128. For example, the communication module 140 sends the information that the 10 supercapacitor units with a power capacity of 120 W, are 12 degrees Celsius above the threshold limit of 30 degrees Celsius.

In one embodiment, the ECS 101 for monitoring and temperature control of the supercapacitor power packs 118 is very efficient and economical in terms of obtaining thermal efficiency and thermal charge cycle as desired for the supercapacitor power packs 118. A super cold environment could be brought into a specification region with a small amount of resistive load, where "specification region" refers to the energy, power, and temperature characteristics and limits that should not be crossed by any of the supercapacitor power packs 118. This could be important for aerospace and other super cold environments. Every supercapacitor has a small amount of electrolyte which poses requirements for a suitable causes temperature range. This temperature range can be extended by changing the electrolyte. A liquid paste to a solid base progression of the electrolyte is highly desired. A small analog system to bring the supercapacitor into thermal specification may be also included in the present system 100. At least one supercapacitor power pack pouch may be added with the motor to 'kick-start' or quick start the lead-acid battery at low temperature, thereby enhancing cold-cranking ability as well as car lead-acid battery. Micropower pack pouches and nano power pack pouches could be included. The supercapacitors may be attached or connected on the trench wall to add capacitance to a Dynamic Random Access Memory (DRAM) circuit design to decrease noise in microprocessors or other computing chips.

For all ranges given herein, it should be understood that any lower limit may be combined with any upper limit, when feasible. Thus, for example, citing a temperature range of from 5° C. to 150° C. and from 20° C. to 200° C. would also inherently include a range of from 5° C. to 200° C. and a range of 20° C. to 150° C.

When listing various aspects of the products, methods, or system described herein, it should be understood that any feature, element or limitation of one aspect, example, or claim may be combined with any other feature, element or limitation of any other aspect when feasible (i.e., not contradictory). Thus, disclosing an example of power pack comprising a temperature sensor and then a separate example of a power pack associated with an accelerometer would inherently disclose a power pack comprising or associated with an accelerometer and a temperature sensor.

Unless otherwise indicated, components such as software modules or other modules may be combined into a single module or component, or divided such that the function involves cooperation of two or more components or modules. Identifying an operation or feature as a discrete single entity should be understood to include division or combination such that the effect of the identified component is still achieved.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A system for monitoring power packs and temperature management of the power packs, the system comprising:
    one or more sensors configured to monitor thermal energy associated with a set of supercapacitor power packs integrated with an electric motor;
    a connection interface that receives information from the one or more sensors regarding a current measurement of thermal energy associated with the set of supercapacitor power packs; and
    a processor that executes instructions stored in memory, wherein the processor executes the instructions to:
        detect a thermal event associated with the set of supercapacitor power packs based on the received measurement of thermal energy,
        compare a thermal efficiency to a threshold value,
        determine that the detected thermal event is associated with a state of charging circuitry for the set of supercapacitor power packs, wherein the determined state of the charging circuitry is further based on the comparing of the thermal efficiency to the threshold value, and wherein the determined state of the charging circuitry is one of an ON state or an OFF state, and
        switch the charging circuitry between the ON state and the OFF state to control charging of the set of supercapacitor power packs based on the determined state.

2. The system of claim 1, wherein the processor executes further instructions to determine a current state of the charging circuitry, and wherein switching the charging circuitry between the ON state and the OFF state includes switching the charging circuitry from the current state to the determined state.

3. The system of claim 1, further comprising:
thermal control hardware that regulates a temperature of the set of supercapacitor power packs based on the determined state of the charging circuitry.

4. The system of claim 3, wherein the thermal control hardware comprises at least one of a heating element or a cooling element.

5. The system of claim 3, wherein the thermal control hardware is associated with a low temperature power source, wherein the thermal control hardware warms one or more supercapacitors of the set of supercapacitor power packs while an ambient temperature is below a predetermined temperature.

6. The system of claim 1, wherein the determined state of the charging circuitry includes individual control of each of the set of supercapacitor power packs.

7. The system of claim 1, wherein the processor executes further instructions to determine at least one of a charge level or a charge rate of each of the set of supercapacitor power packs, and wherein the determined state of the charging circuitry is further based on at least the one of the charge level or the charge rate.

8. The system of claim 1, wherein switching the charging circuitry between the ON state and the OFF state is also based on a predetermined threshold amount of charge to be stored by the set of supercapacitor power packs.

9. A method for monitoring power packs and temperature management of the power packs, method comprising:
monitoring thermal energy associated with a set of supercapacitor power packs integrated with an electric motor via one or more sensors;
receiving information at a connection interface, the information received from the one or more sensors regarding a current measurement of thermal energy associated with the set of supercapacitor power packs; and
executing instructions stored in memory, wherein executing the instructions by a processor:
detects a thermal event associated with the set of supercapacitor power packs based on the received measurement of thermal energy,
compares a thermal efficiency to a threshold value,
determines that the detected thermal event is associated with a state of charging circuitry for the set of supercapacitor power packs, wherein the determined state of the charging circuitry is further based on the comparison, and wherein the determined state of the charging circuitry is one of an ON state or an OFF state, and
switches the charging circuitry between the ON state and the OFF state to control charging of the set of supercapacitor power packs based on the determined state.

10. The method of claim 9, wherein the instructions are further executed to determine a current state of the charging circuitry, and wherein switching the charging circuitry between the ON state and the OFF state includes switching the charging circuitry from the current state to the determined state.

11. The method of claim 9, wherein the instructions are further executed to regulate a temperature of the set of supercapacitor power packs using thermal control hardware based on the determined state of the charging circuitry.

12. The method of claim 11, wherein the thermal control hardware comprises at least one of a heating element or a cooling element.

13. The method of claim 11, wherein the thermal control hardware is associated with a low temperature power source, wherein the thermal control hardware warms one or more supercapacitors of the set of supercapacitor power packs while an ambient temperature is below a predetermined temperature.

14. The method of claim 9, wherein the determined state of the charging circuitry includes individual control of each of the set of supercapacitor power packs.

15. The method of claim 9, wherein the instructions are further executed to determine at least one of a charge level or a charge rate of each of the set of supercapacitor power packs, and wherein the determined state of the charging circuitry is further based on at least the one of the charge level or the charge rate.

16. The method of claim 9, wherein switching the charging circuitry between the ON state and the OFF state is also based on a predetermined threshold amount of charge to be stored by the set of supercapacitor power packs.

17. A non-transitory, computer-readable storage medium, having embodied thereon a program executable by a processor to perform a method for monitoring power packs and temperature management of the power packs, the method comprising:
monitoring thermal energy associated with a set of supercapacitor power packs integrated with an electric motor via one or more sensors;
receiving information at a connection interface, the information received from the one or more sensors regarding a current measurement of thermal energy associated with the set of supercapacitor power packs; and
executing instructions stored in memory, wherein executing the instructions by a processor:
detects a thermal event associated with the set of supercapacitor power packs based on the received measurement of thermal energy,
compares a thermal efficiency to a threshold value,
determines that the detected thermal event is associated with a state of charging circuitry for the set of supercapacitor power packs, wherein the determined state of the charging circuitry is further based on the comparison, and wherein the determined state of the charging circuitry is one of an ON state or an OFF state, and
switches the charging circuitry between the ON state and the OFF state to control charging of the set of supercapacitor power packs based on the determined state.

* * * * *